(12) United States Patent
Ushiyama

(10) Patent No.: US 7,853,718 B2
(45) Date of Patent: Dec. 14, 2010

(54) INFORMATION DELIVERY SYSTEM, REREGISTRATION MESSAGE SENDING METHOD, NODE DEVICE, AND RECORDING MEDIUM RECORDING NODE PROCESSING PROGRAM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 240 days.

(21) Appl. No.: 12/219,229

(22) Filed: Jul. 17, 2008

(65) Prior Publication Data

US 2008/0288657 A1      Nov. 20, 2008

Related U.S. Application Data

(63) Continuation-in-part of application No. PCT/JP2007/050088, filed on Jan. 9, 2007.

(30) Foreign Application Priority Data

Jan. 30, 2006    (JP)    ............................. 2006-020629

(51) Int. Cl.
*G06F 15/173* (2006.01)
(52) U.S. Cl. .................. 709/242; 709/243; 709/238
(58) Field of Classification Search .............. 709/201, 709/203, 205, 206, 223, 224, 227, 228, 231, 709/238, 239, 240, 241, 242, 243, 244
See application file for complete search history.

(56) References Cited

U.S. PATENT DOCUMENTS

| | | | | |
|---|---|---|---|---|
| 6,038,236 | A * | 3/2000 | Houjou et al. | 370/465 |
| 6,044,076 | A * | 3/2000 | Yamamoto | 370/392 |
| 6,175,874 | B1 * | 1/2001 | Imai et al. | 709/238 |
| 7,697,930 | B2 * | 4/2010 | Miao et al. | 455/432.1 |

2003/0120917 A1    6/2003    Itonaga et al.

(Continued)

FOREIGN PATENT DOCUMENTS

JP      A-2003-188918      7/2003

(Continued)

OTHER PUBLICATIONS

Oka et al., "Lightweight Load Balancing for Distributed Hash Tables", The Institute of Electronics, Information and Communications Engineers, Feb. 2004.

(Continued)

*Primary Examiner*—Le Luu
(74) *Attorney, Agent, or Firm*—Oliff & Berridge, PLC

(57) ABSTRACT

In an information delivery system including a plurality of node devices mutually communicable through a network,
transfer destination node information is respectively memorized in the node devices, and at least one piece of delivery information is distributed and stored therein, and
a registration message including storage source node information indicative of one node device storing the delivery information is sent out and transferred to a node device for managing delivery information location through relay node devices in accordance with the transfer destination node information, and the storage source node information is memorized in the relay node devices and the node device for managing delivery information location,
wherein the relay node device includes:
a memory means;
a node information change detection means;
a storage source node information extraction means;
a reregistration message generation means for generating a reregistration message including the storage source node information; and
a reregistration message sending means.

16 Claims, 13 Drawing Sheets

U.S. PATENT DOCUMENTS

| | | |
|---|---|---|
| 2004/0054807 A1 | 3/2004 | Harvey et al. |
| 2005/0091333 A1* | 4/2005 | Kobayashi et al. .......... 709/212 |
| 2006/0007942 A1 | 1/2006 | Ogawa |
| 2007/0297422 A1* | 12/2007 | Matsuo et al. .............. 370/400 |

FOREIGN PATENT DOCUMENTS

| | | |
|---|---|---|
| JP | A-2003-244210 | 8/2003 |
| JP | A-2004-127074 | 4/2004 |
| JP | A-2004-266796 | 9/2004 |
| JP | A-2006-25355 | 1/2006 |

OTHER PUBLICATIONS

Zhao et al. "Tapestry: An Infrastructure for Fault-tolerant Wide-area Location and Routing", Computer Science Division, University of California, Berkeley, Report No. UCB/CSD-01-1141, Apr. 2001.

Sep. 14, 2010 Office Action issued in Japanese Patent Application No. 2006-020629 (with translation).

* cited by examiner

FIG. 2

ROUTING TABLE USING DHT OF NODE n1 — 51

| | 0XX AREA<br>NODE ID:002 | 1XX AREA<br>NODE ID:122 | 2XX AREA<br>NODE ID:221 | 3XX AREA<br>NODE ID:301 |
|---|---|---|---|---|
| LEVEL 1 | IP ADDRESS AND PORT NUMBER OF NODE n15 | IP ADDRESS AND PORT NUMBER OF NODE n1 | IP ADDRESS AND PORT NUMBER OF NODE n4 | IP ADDRESS AND PORT NUMBER OF NODE n11 |
| | 10X AREA<br>NODE ID:102 | 11X AREA<br>NODE ID:112 | 12X AREA<br>NODE ID:122 | 13X AREA<br>NODE ID:131 |
| LEVEL 2 | IP ADDRESS AND PORT NUMBER OF NODE n8 | IP ADDRESS AND PORT NUMBER OF NODE n13 | IP ADDRESS AND PORT NUMBER OF NODE n1 | IP ADDRESS AND PORT NUMBER OF NODE n10 |
| | NODE ID:120 | NODE ID:121 | NODE ID:122 | (NOT REGISTERED) |
| LEVEL 3 | IP ADDRESS AND PORT NUMBER OF NODE n12 | IP ADDRESS AND PORT NUMBER OF NODE n6 | IP ADDRESS AND PORT NUMBER OF NODE n1 | |

ID SPACE OF DHT

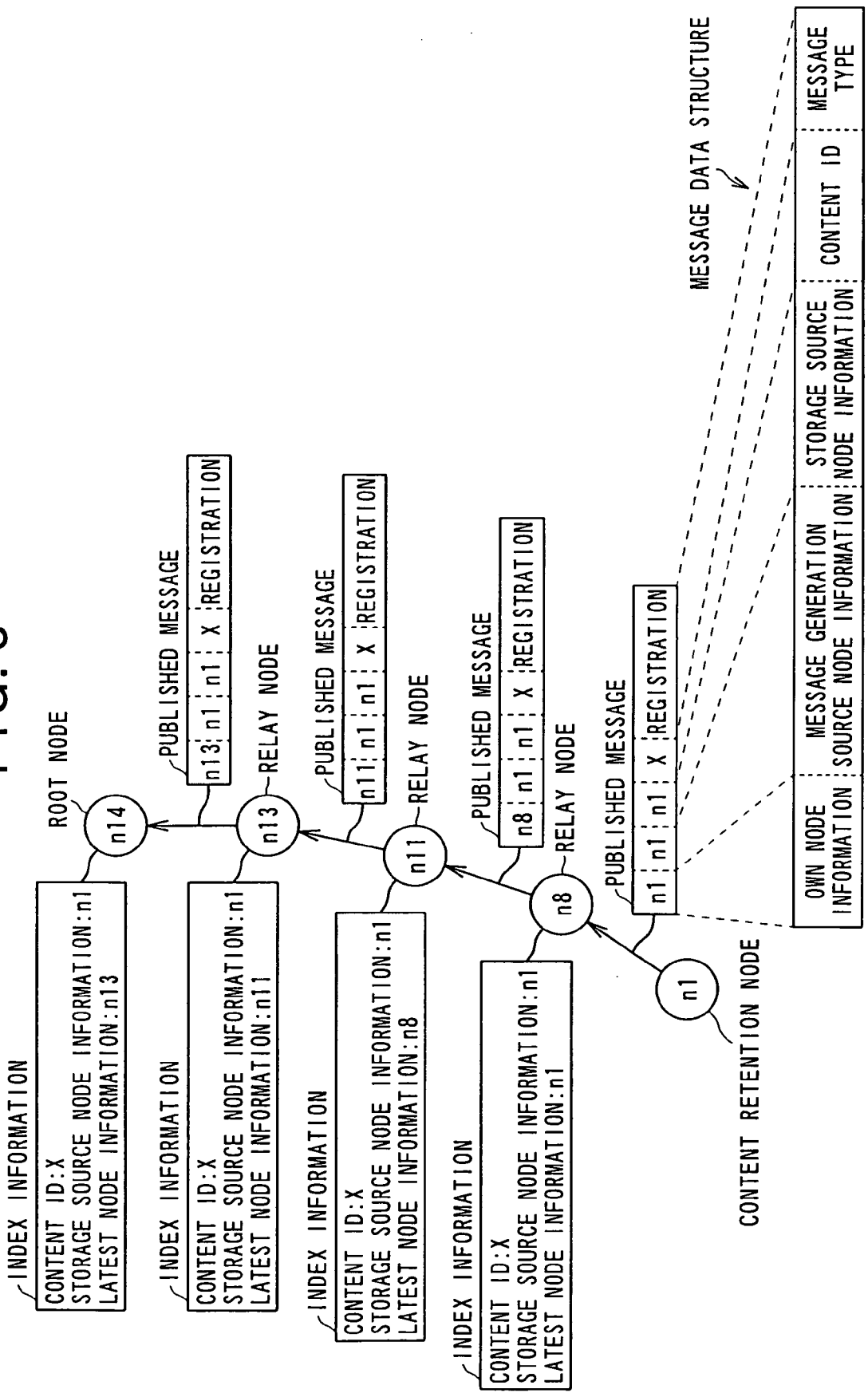

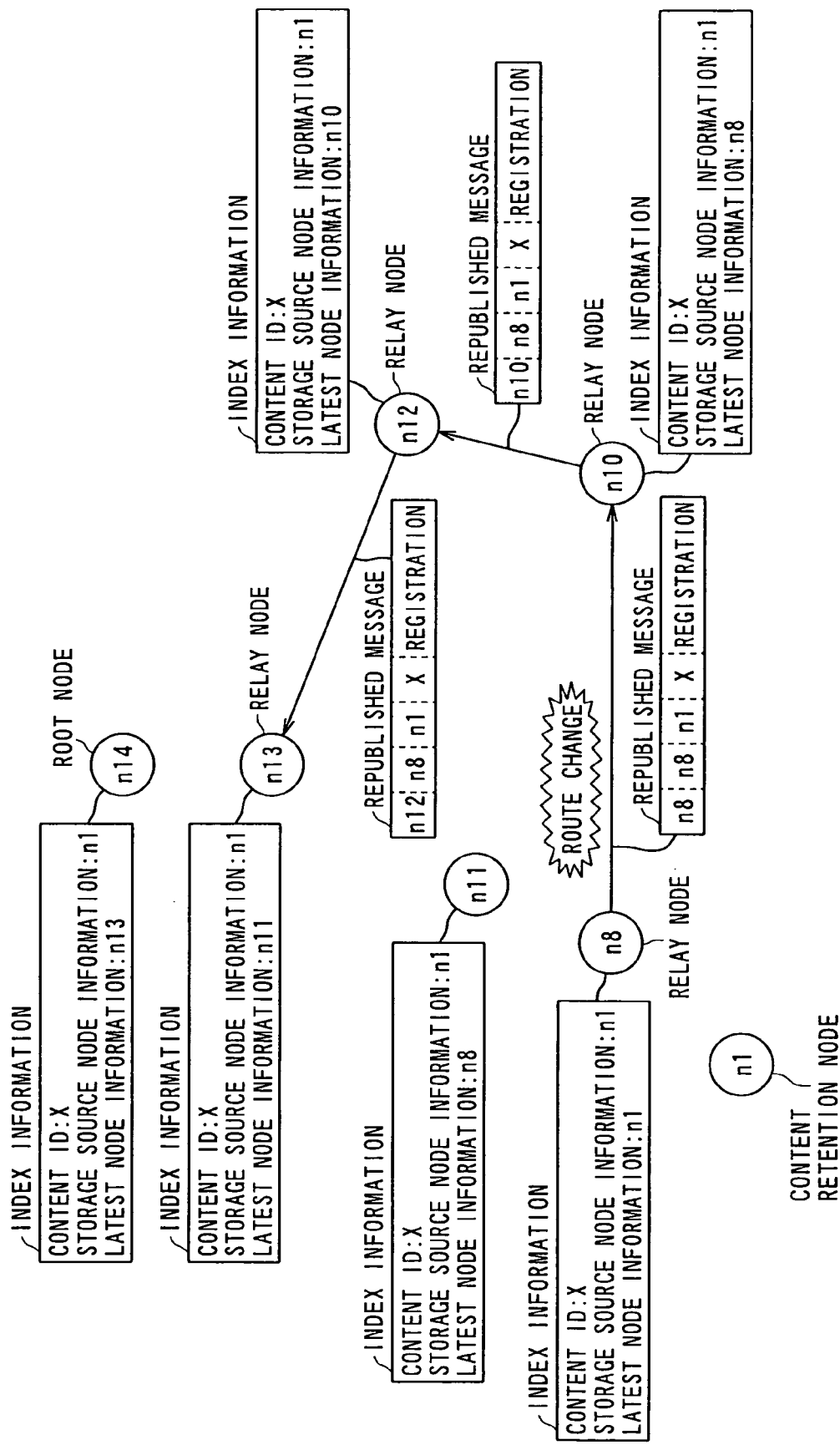

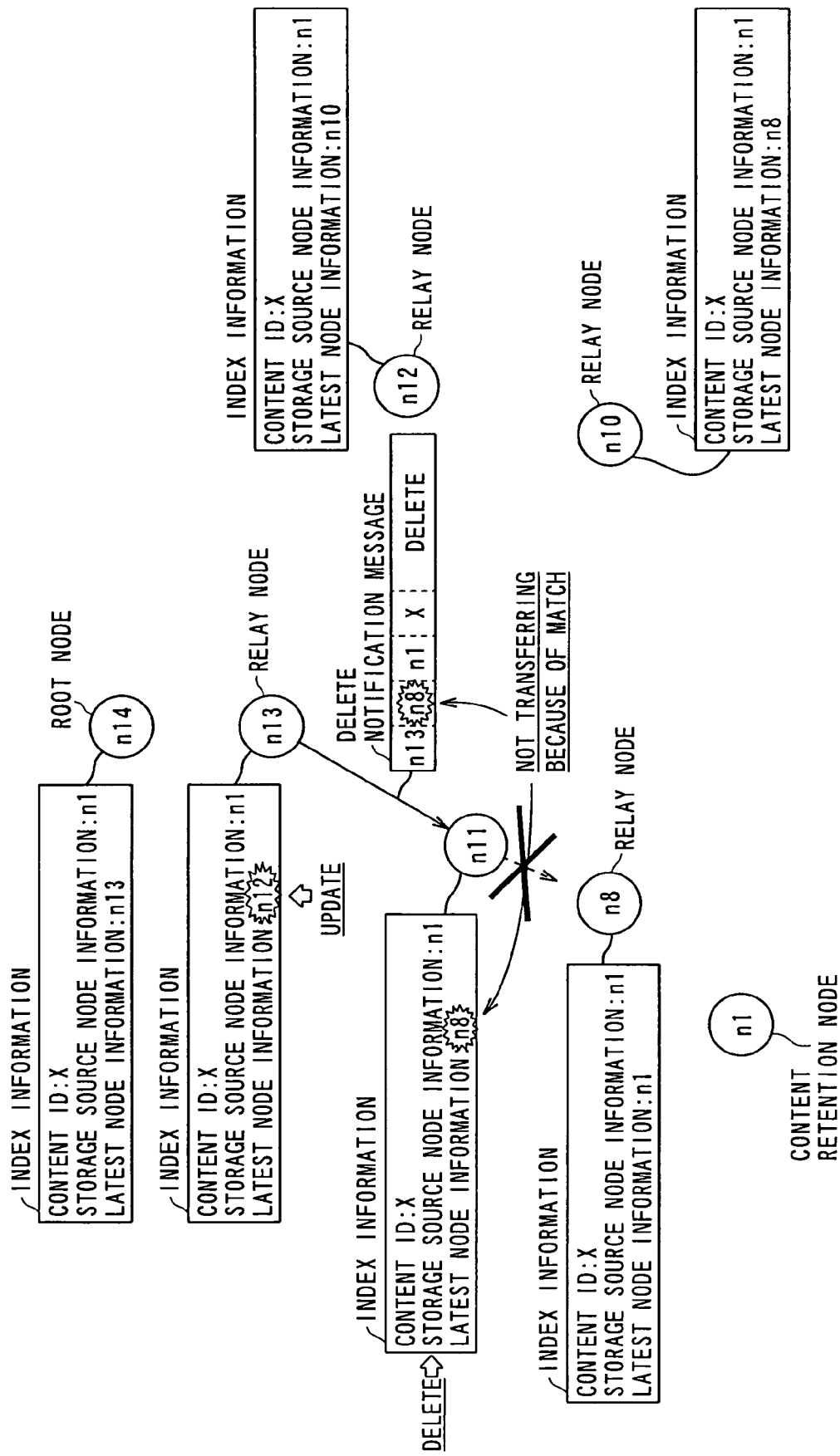

INFORMATION DELIVERY SYSTEM, REREGISTRATION MESSAGE SENDING METHOD, NODE DEVICE, AND RECORDING MEDIUM RECORDING NODE PROCESSING PROGRAM

The entire disclosure of Japanese Patent Application (No. 2006-020629) filed on Jan. 30, 2006 including the specification, claims, drawings and abstract are incorporated herein by reference in its entirety.

FIELD OF THE INVENTION

The present invention relates to a peer-to-peer (P2P) type information delivery system including a plurality of node devices enabled to mutually communicate through a network, wherein transfer destination node information indicative of node device of transfer destination of message received from the other node device is memorized in the respective node devices, and information delivery system and the like, wherein delivery information is distributed into and retained by plural node devices, particularly related to an art of managing node information indicative of the node device retaining the delivery information.

BACKGROUND OF THE INVENTION

As this kind of peer to peer type information delivery system, there is known a method of enhancing fault tolerance and property of distributing accesses by distributing and allocating (distributing and storing) delivery information (e.g. content data) in plural node devices participating in the system. Location of the content data thus distributed and stored can be efficiently searched for by use of a distributed hash table (hereinafter referred to as "DHT") as disclosed by for example non-patent document 1. This DHT is memorized in respective node devices, and transfer destination node information (including e.g. node ID, IP address and port number unique to the node device) indicative of plural node devices to which the message is addressed is registered in the DHT.

For example, in a case where the above-mentioned content data are stored in a given node device, the node device sends out a registration message (including content ID unique to the content data and storage source node information indicative of the node device), which indicates a registration request of storage source node information (including e.g. IP address and port number) indicative of the node device, to the other node devices. The registration message is transferred to the source node device managing a content data location (to the root node described later) by plural relay node devices according to the above-mentioned content ID and DHT, the storage source node information is memorized in the management source node device and managed. Further, the storage source node information is also memorized and managed in the above-mentioned plural relay node devices in the transfer route of the registration message.

Then, the node device desiring to acquire the above-mentioned content data sends out content location inquiry (search) message (including the content ID and the node information indicative of the node device) searching the location of the content data to the other node device. Then the content location inquiry (search) message is transferred to the node device managing the content data location by plural relay nodes devices (in some cases the relay node devices corresponding to the relay node devices in the transfer route of the registration message, and in other cases they being not). In a case where the relay node device located in the transfer route manages the storage source node information, the node device sending out the content location inquiry (search) message acquirers the storage source node information from the relay node device. In a case where any relay node devices existing in the transfer route do not manage the above storage source node information, the storage source node information is acquired from the management source node device which the message finally reaches. Accordingly, the node device sending out the content location inquiry (search) message is enabled to acquire the content data from the node device specified by the storage source node information.

Non-Patent Document 1: "Lightweight Load Balancing for Distributed Hash Tables", Institute of Electronics, Information and Communication Engineers

SUMMARY OF THE INVENTION

Meanwhile, in the peer-to-peer type information delivery system, since participation or withdrawal (turn-off and the like) of the node devices are frequently repeated, the transfer route from the node device storing the content data to the management source node device is changed in some cases. In such the case, since the storage source node information is desired to memorize in the relay node device in the changed transfer route, it is considered that the node device storing content data sends out reregistration messages at predetermined intervals.

However, there are problems. Sending out reregistration messages at predetermined intervals places much burden on the network. Further in a case of no change of the transfer route, the reregistration messages are sent out wastefully.

The present invention is provided in view of the above problems, and an object of the present invention is to provide an information delivery system, a reregistration message sending method, a node device, and a recording medium recording a node processing program, which can efficiently (without waste) memorize the storage source node information in the relay node device in a new transfer route after changing, in a case where the transfer route from the node device storing the content data to the management source node device is changed.

To solve the above problem, according to a first aspect of the present invention there is provided a node device included in an information delivery system, which includes a plurality of node devices enabled to mutually communicate through a network, wherein transfer destination node information indicative of a node device, among the node devices, to which a message received from another node device, among the node devices, is transferred is respectively memorized in the node devices, and at least one piece of delivery information is distributed and stored in the node devices, wherein a registration message including storage source node information indicative of one node device, among the node devices, storing the delivery information is sent out of the one node device in a case where the delivery information is stored in the one node device, the registration message is transferred up to a node device, among the node devices, for managing delivery information location through a plurality of relay node devices, among the node devices, in accordance with the transfer destination node information, and the storage source node information is memorized in the relay node devices and the node device for managing delivery information location, wherein the relay node device included in the information delivery system, including:

a memory means for memorizing the transfer destination node information and the storage source node information;

a node information change detection means for detecting a change of the transfer destination node information;

a storage source node information extraction means for extracting the storage source node information, which is included in the registration message transferred in accordance with the transfer destination node information before the change, from the memory means;

a reregistration message generation means for generating a reregistration message including the storage source node information thus extracted; and a reregistration message sending means for sending thus generated reregistration message in accordance with the transfer destination node information after the change.

According to the first aspect of the invention, in a case where the relay node detects the change of the transfer destination node information, the storage source node information included in the registration message thus transferred in accordance with the transfer destination node information before the change is extracted from the memory means, the reregistration message including the storage source node information thus extracted is sent in accordance with the transfer destination node information after the change. Therefore, it is possible to make a relay node device on a new transfer route after change memorize storage source information more efficiently without imposing much load on a network in comparison with a case of sending out the reregistration messages at a predetermined interval.

According to the present invention, in a case where the relay node device detects a change of transfer destination node information, the relay node device extracts storage source node information included in a registration message transferred according to the transfer destination node information before change from a memory means, generates a reregistration message including the storage source node information thus extracted, and sends this in accordance with transfer destination node information after the change. Therefore, compared with sending reregistration message at predetermined intervals, it is possible to more efficiently (without waste) memorize the storage source node information in the relay node device in the new transfer route after change, without increasing burden on the network.

Further, a deletion message indicative of a request for deleting the storage source node information included in the reregistration message is sent in accordance with the immediately previous node information memorized in correspondence with the storage source node information. Therefore, in a case where the transfer route is changed and the node device storing the delivery information withdraws, or the node device deletes the delivery information, the storage source node information can be deleted more efficiently (without waste) and securely. Further, because the deletion message is sent out only in the case where the route is changed, the storage source node information can be securely deleted without reducing search efficiency of delivery information and without burdening on the network.

BRIEF DESCRIPTION OF THE DRAWINGS

FIG. 2 is a view showing an example of a DHT routing table retained by a node n1;

FIG. 5 is a view showing an example of published message content (data structure) transferred from the content retention node to a root node through a relay node and index information content memorized in the relay node and the root node;

FIG. 6 is a schematic view showing a state where a republished message is sent out;

FIG. 7 is a schematic view showing a state where a republished message is sent out;

DETAILED DESCRIPTION OF THE PREFERRED EMBODIMENTS

Figure 1:
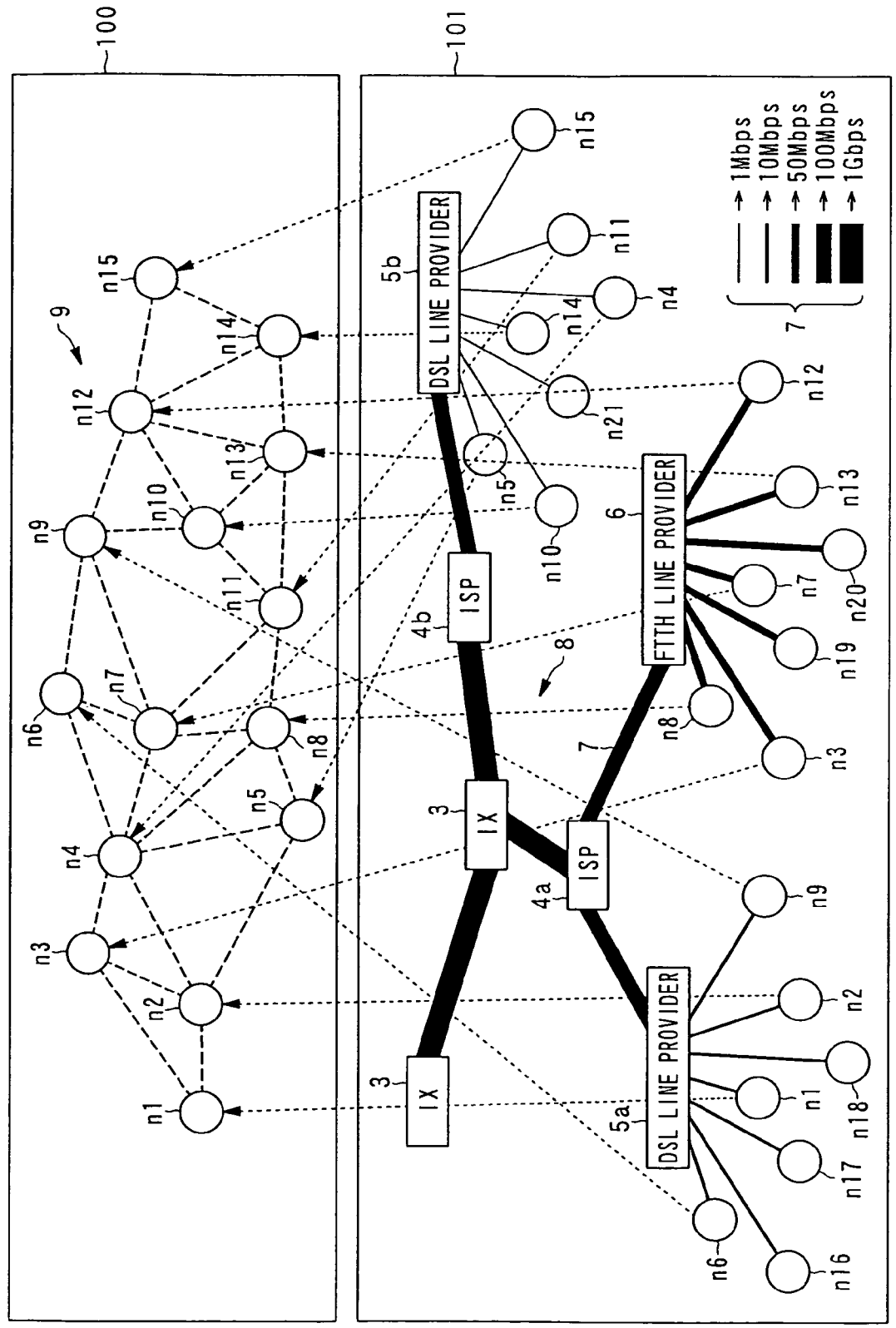
FIG. 1 is a view showing an example of connection status of respective node devices in a content delivery system.

Each designation of numerical reference in the drawings is typically as follows:
nn: Node;
8: Network;
9: Overlay network;
11: Control unit;
12: Memory unit;
13: Buffer memory;
14: Decoder;
15: Image processing unit;
16: Display unit;
17: Audio processing unit;
18: Speaker;
20: Communication unit;
21: Input unit;
22: Bus; and
S: Content delivery system Hereinafter, embodiments of the present invention will be described in reference of drawings. Here, the embodiments explained below are embodiments of applying the present invention to a content delivery system.

[1. Configuration and the Like of Content Delivery System]

First, with reference to FIG. 1, a schematic configuration and the like of a content delivery system as an example of an information delivery system will be described.

FIG. 1 is a view showing an example of connection status of respective node devices in a content delivery system according to the present embodiment.

As shown in a lower frame 101 of FIG. 1, a network (communication network in real world) 8 of the Internet or the like is constructed by an internet exchange (IX) 3, internet service providers (ISP) 4a and 4b, digital subscriber line (DSL) providers (or device thereof) 5a and 5b, a fiber to home line provider (or device thereof) 6, and a communication line (e.g. a phone line or an optical cable) 7 and the like. Here, in the network 8 (a communication network) of the example of FIG. 1, a router for transferring data (packet) is appropriately inserted (not shown in the figures).

The content delivery system S is provided with plural node devices (hereinafter referred to as "nodes") n1, n2 . . . n21, which are mutually connected through the network 8, wherein the system is a Peer to Peer type network system (actually more nodes existing). Further, a unique manufacturing number and an IP (Internet Protocol) address are allocated to each of the nodes n1 to n21. Such manufacturing numbers and IP addresses do not overlap among plural nodes.

In the content delivery system S, an overlay network 9 is configured by a specific algorithm, for example an algorithm using DHT, as shown in an upper frame 100 of FIG. 1. This overlay network 9 means a network (logical network) configuring a virtual link formed by use of an existing network 8.

The present embodiment is provided on a premise of an overlay network 9 configured by an algorithm using DHT. The nodes n1 to n15 allocated to this overlay network 9 (in upper frame 100 of FIG. 1) are referred to as nodes nn participating in the overlay network 9. In other words, the overlay network 9 is configured by participation of nodes nn. Such the participation into the overlay network 9 is done when non-participating nodes n16 to n21 send a participation message as participation request information indicative of participation request to an node arbitrarily selected nn already participating.

The respective nodes nn have a node ID as unique identification information, and the node ID is a hash value (bit length of 160 bits) obtained by hashing for example IP addresses or manufacturing numbers with a common hash function (e.g. SHA-1), whereby a node ID is delivered and located in one ID space without deviation.

As described above, the node ID obtained (hashed) by a common hash function has a very low possibility of having the same value if the IP address or the manufacturing number differs. Here, because the hash function is known, detailed explanation thereof is omitted.

Further, respective nodes nn retain DHT. This DHT stipulates transfer destination of various types of messages on the overlay network 9. Specifically, a routing table (transfer destination table) is included, and in the routing table, plural pieces of transfer destination node information including a node ID, IP address, and port number of the nodes nn which are appropriately apart in the node ID space are registered.

Figure 3:
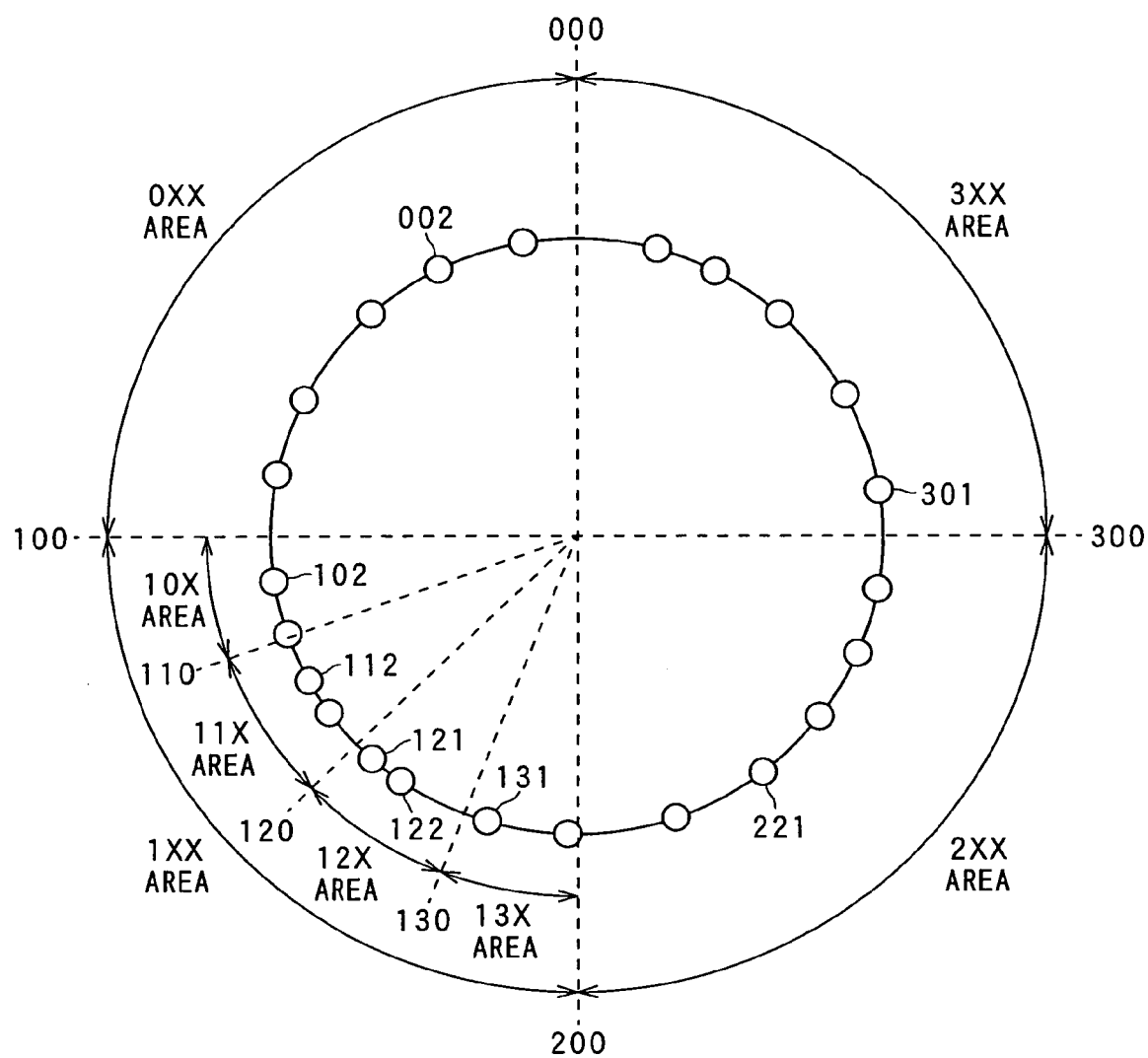
FIG. 3 is a schematic view showing an example of a node ID space of the DHT.

FIG. 2 is a view showing an example of a routing table of the DHT retained by the node n1. FIG. 3 is a conceptual view showing an example of a node ID space of the DHT.

Here, in the examples of FIGS. 2 and 3, for easy of explanation, a bit length of a node ID is set up to be 2 bits×3 digits=6 bits, and each of the digits is expressed by quaternary number (an integer between 0 and 3) (practically, a longer bit length is used and each digit is divided into, for example, 4 bits each and expressed by hexadecimal of 0 to f).

In the example of FIG. 2, the routing table of the DHT includes tables of levels 1 to 3 (classified into plural levels). In a table entry of each level, node IDs and IP addresses and port numbers of a node nn corresponding to the node IDs are associated and registered as node information of transfer destination with respect to each area. Each area of a table in each level is an area obtained by dividing a node ID space of the DHT. For example, as shown in FIG. 3, in level 1, an entire node ID space of the DHT is divided into four parts, and an area where node IDs "000" to "033" exist is designated as a 0XX area, an area where node IDs "100" to "133" exist is designated as a 1XX area, an area where node IDs "200" to "233" exist is designated as a 2XX area, and an area where node IDs "300" to "333" exist is designated as a 3XX area. Moreover, in level 2, areas in level 1 (in other words, areas "0XX" to "3XX") are further divided into four parts. For example, a 1XX area is divided into four parts and an area where node IDs "100" to "103" exist is designated as a 10X area, an area where node IDs "110" to "113" exist is designated as a 11X area, an area where node IDs "120" to "123" exist is designated as a 12X area, and an area where node IDs "130" to "133" exist is designated as a 13X area.

Then, for example, provided that a node ID of a node n1 is "122" as shown in FIG. 2, in a table of 1XX area (where the own node exists) in level 1 of the node n1, a node ID, an IP address and the like of the own node (because IP address belongs to the own node, registration of the IP address in the routing table is not required) are registered, and in areas where the own node does not exist (in other words, 0XX, 2XX, and 3XX areas), node IDs, IP addresses and the like of other nodes nn arbitrarily selected are registered.

Moreover, in the table of 12X area (an area where the own node exists) in level 2 of the node n1, as shown in FIG. 2, an node ID, an IP address and the like of the own node (because IP address belongs to the own node, registration of the IP address in the routing table is not required) are registered and in areas where the own node does not exist (in other words, 10X, 11X, and 13X areas), node IDs, IP addresses and the like of other nodes nn arbitrarily selected are registered.

Further, in level 3 of the node n1, as shown in FIG. 2, node IDs between "120" and "122", an IP address (because IP address belongs to the own node, registration of the IP address in the routing table is not required), and the like are registered.

In the examples of FIGS. 2 and 3, because a bit length of node IDs is set up to be 3 digits×2 bits, a table having three levels 1 to 3 is sufficient. However, when the bit length of node ID increases, level of tables as many as the increased bit lengths is required (for example, in a case where the bit length of node ID is set to be 16 digits×4 bits, a table of 16 levels is required).

As described above, in a routing table of DHT according to the present embodiment, the higher the level becomes, the narrower the area becomes.

Such the DHT is given to a non-participant node when it participates in the overlay network 9.

Meanwhile, data (an example of delivery information) of various content (e.g. movie, music or the like) are distributed and saved (stored) in plural nodes nn (in other words, content data are copied and a replica of copy information are distributed and stored).

For example, content data of a movie having a title of XXX are stored in nodes n1 and n4. Meanwhile, content data of a movie having a title of YYY is stored in nodes n2 and n3. In such a manner, content data are distributed in plural nodes nn (hereinafter referred to as a "content retention node") and stored. Moreover, to each of these content data, information such as a content name (title) and a content ID (identification information unique to each content) are added. The content ID is generated by, for example, hashing content name+arbitrary numerical value (or upper some bytes of the content data) by the hash function commonly used to obtain the node ID (allocated in the same ID space as the node ID). Alternatively, a system operator may give a unique ID value (same bit length as a node ID) to each content. In this case, "content list" describing association between a content name and a content ID is distributed to all the nodes nn.

Further, location of the content data thus distributed and stored, in other words, index information including a group of storage source node information (including e.g. IP address and port number) indicative of a node nn storing the content data and a content ID or the like corresponding to the content data is memorized (in an index cache) and managed by a node nn which manages location of the content data (hereinafter referred to as a "root node" or a "root node of the content (content ID)").

For example, index information regarding content data of the movie having a title of XXX is managed by a node n13 being a root node of the content (content ID), and index information regarding content data of the movie having a title of YYY is managed by a node n14 being a root node of the content (content ID). In other words, because the root nodes are divided with respect to each content, load is distributed. Moreover, even in a case where the same content data (same content ID) are stored in plural content retention nodes, index information of such content data can be managed by one root node. Moreover, such a root node is set to be, for example, a node nn having a node ID closest to a content ID (e.g. upper digits match the most).

Then, control of distribution and storage of the content data are carried out with for example a content management server (not shown) (or may be carried out by a highly reliable node nn which is selected by the system operator and regularly participates in the overlay network 9). For example, the content management server counts frequency of accesses to the content data (content retention node) and popularity of the content data (counted by for example respective root node and respective content retention node) and determines whether the number of content data (replica) stored with respect to each content data is increased or decreased. Then in a case where the content management server determines to increase the content data, it selects a node nn arbitrarily selected (e.g. selecting at random) to have content data stored and requests thus selected node nn to store the content data. When a response of acceptance to store the content data is responded from the node nn, the content data is delivered to the node nn and stores them. On the other hand, when the content management server determines to decrease the content data, it selects a node nn arbitrarily selected storing the content data (e.g. selecting from index information acquired from the root node at random), requests thus selected node nn to delete the content data, and deletes the content data from the node nn.

Here, the control of distribution and storage of the content data may not be done by the content management server. The number of the content data naturally increases, for example simply because popular contents are downloaded by many nodes nn. On the other hand, the number of the content data subsequently losing their popularity naturally decreases because such the content data are deleted by the node nn.

The node nn thus storing the content data (content retention node) generates a published (registration notification) message including the content ID of the content data, the own node information (storage source node information) or the like (registration message indicative of a request for registering storage source node information because the content data are stored) in order to notify to the root node that the content data are stored, and sends out the published message to the root node thereof. Therefore, the published message reaches the root node by a DHT routing using a content ID as a key.

Meanwhile, the node nn (content retention node) with its content data deleted generates a deletion notification message including the content ID of the content data, the own node information (storage source node information) or the like (deletion message indicative of a request for deleting storage source node information because the content data are deleted) in order to notify to the root node that the content data are deleted, and sends out the deletion notification message to the root node thereof. Therefore, the deletion notification message reaches the root node by DHT routing using a content ID as a key.

Figure 4A:
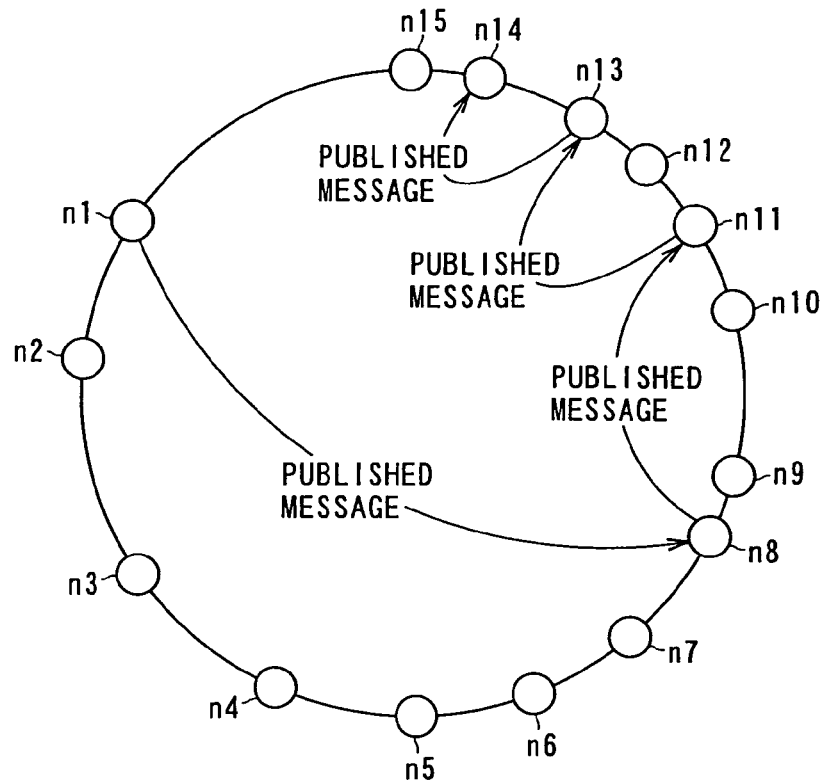
FIG. 4A is a schematic view showing an example of a flow of a published message sent out from the content retention node in a node ID space of the DHT.
Figure 4B:
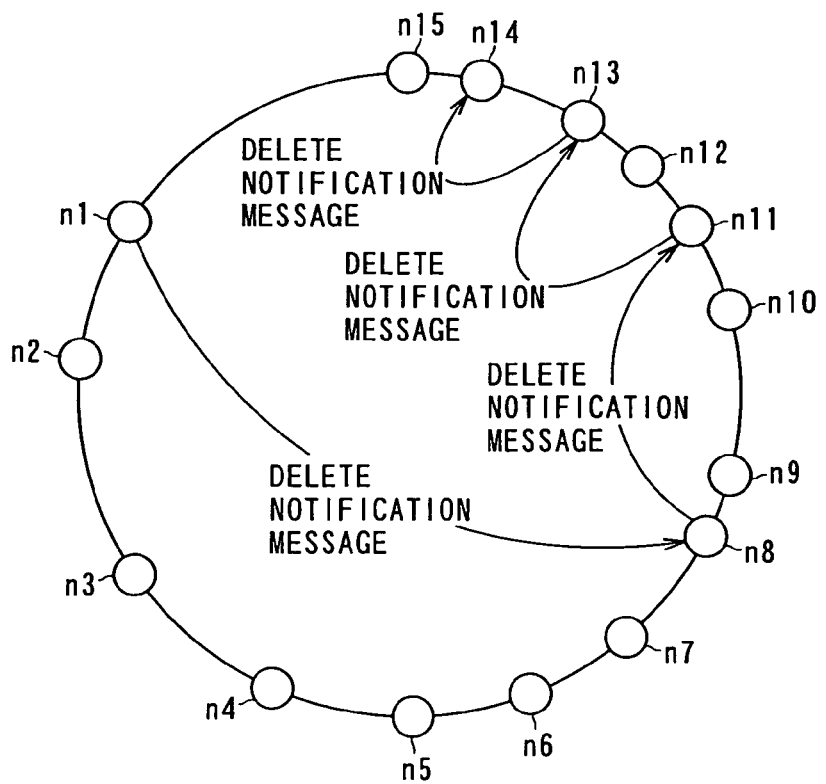
FIG. 4B is a schematic view showing an example of a flow of a deletion notification message sent out from the content retention node in a node ID space of the DHT.

FIG. 4A is a schematic view showing an example of a flow of published message sent from a content retention node, and FIG. 4B is a schematic view showing an example of a flow of deletion notification message sent from a content retention node in an ID space of DHT, respectively.

In the example of FIG. 4A, for example a node n1, being a content retention node, refers to a table of level 1 of the own DHT (not related with the DHT routing table shown in FIG. 2), acquires an IP address and a port number of, for example, a node n8 having a node ID closest to a content ID included in the published message (e.g. upper digits match the most), and sends the published message to the IP address and the port number.

Meanwhile, the node n8 receives the published message, refers to a table of level 2 of the own DHT, acquires an IP address and a port number of, for example, a node nil having a node ID closest to a content ID included in the published message (e.g. upper digits match more), and transfers the published message to the IP address and the port number.

Meanwhile, the node nil receives the published message, refers to a table of level 3 of the own DHT, acquires an IP address and a port number included in transfer destination node information of, for example, a node n13 having a node ID closest to the content ID included in the published message (e.g. upper digits match the most), and transfers the published message to the IP address and the port number.

Meanwhile, the node n13 receives the published message, refers to a table of level 4 of the own DHT, acquires an IP address and a port number included in transfer destination node information of, for example, a node n14 having a node ID closest to the content ID, included in the published message (e.g. upper digits match the most), and transfers the published message to the IP address and the port number.

Meanwhile, the node n14 receives the published message, refers to a table of level 5 of the own DHT, recognizes that the node ID closet to the content ID included in the published message is the own node (e.g. upper digits match the most), in other words, the own node is the root node of the content ID, and registers (memorizes in the index cache region) storage source node information included in the published message and content index information including a group of content ID.

Here, the index information including the group of storage source node information and content ID, included in the published message, is registered (cached) in a node nn (hereinafter referred to as "relay node", e.g. node n8, node n11, and node n13 in an example of FIG. 4A) on a transfer route from the content retention node to the root node (the relay node thus caching the storage source node information is referred to as cache node).

In other words, the published message is transferred by the plural relay nodes to the root node of the content ID included in the published message according to transfer destination node information registered in the DHT routing table. Then the index information including storage source node information and the content ID, included in the published message, is memorized in the plural relay nodes and the root node.

Meanwhile, a flow of the deletion notification message in an example of FIG. 4B is similar to that of the published message. The deletion notification message sent from the node n1, being a content retention node, is transferred to reach the node n14 being a root node of the above-mentioned content ID, and the node n14 deletes the storage source node information and the content ID, included in the deletion notification message, from the own index information. Here, the storage source node information and the content ID, included in the deletion notification message, are also deleted in the relay node (in an example of FIG. 4B, the nodes caching the index information are node n8, node n11, and node n13) on the transfer route from the content retention node to the root node. In other words, the deletion notification message indicates the request for deleting the storage source node information and the like even in the relay node (cache node) on the transfer route to the root node. Thus in a case where the route is not changed after the time of transferring the published message, the old storage source node information memorized in the relay node on the transfer route to the root node can be assuredly deleted.

In a case where a user of a node nn wishes to acquire the desired content data, the node nn required to acquire the content data therefrom (hereinafter, referred to as "user node") sends out a content location inquiry (search) message including a content ID of content data selected by the user (e.g. selection from the content list delivered to all the nodes nn (the list describing a content name, a content ID or the like and, for example, managed in a content list management server (not shown))) to the other node nn according to the own DHT routing table. Thus the content location inquiry message routes (transfers) through several relay nodes to reach the root node of the content ID by DHT routing using the content ID as a key, in a manner similar to the above-mentioned published message. The user node acquires (receives) index information of the content data from the other root nodes and connects to the content retention node storing the content data based on the storage source node information included in the index information thereby enabling to acquire (download) the content data from there. Here, the user node may also acquire (receive) the index information from the relay node (cache node) caching the index information same as the root node before the content location inquiry message reaches the root node.

In the present embodiment, it is further configured such that the published message includes the own node information (e.g. inclusion of IP address and port number) indicative of the node nn (i.e. indicating its own) sending or transferring a published message or a republished message described later and a message generation source node information (e.g. inclusion of IP address and port number) indicative of the node nn generating the published message, in addition to the above-mentioned storage source node information and the content ID. Further, latest node information indicative of the latest node nn sending or transferring the published message is included in the above-mentioned index information in addition to the above-mentioned storage source node information and the content ID.

FIG. 5 shows an example of content (data structure) of the published message transferred through the relay node from the content retention node and content of the index information memorized in the relay node and the root node. As shown in FIG. 5, a published message includes own node information, message generation source information, storage source node information, content ID, and message type ("registration" included in case of a published message and a republished message, and "delete" included in case of a deletion notification message), and index information includes a content ID, a storage source node ID and a latest node information. The latest node information in the index information is acquired from the own node information in the published message and becomes necessary in a case where the transfer route from the content retention node to the root node changes.

Then in a case where the transfer route from the content retention node to the root node changes, the relay node detects the route change (specifically detecting change of transfer destination node information registered in the DHT routing table), and the republished message is sent out to the relay node in order to register the index information to the relay node in the new transfer route.

FIGS. 6 and 7 are schematic views showing a state where a republished message is sent out. As shown in FIG. 6, when the relay node n8 detects a change of transfer destination node information (e.g. change from the relay node nil to the relay node n10) registered in the DHT routing table, it generates a republished message including an own caching storage source node information, a content ID or the like and sends this to the relay node n10 in the new transfer route after change. The republished message is transferred by the relay nodes n10 and n12 in the transfer route after change, and the index information is registered in the relay nodes n10 and n12. Then, when the republished message is received by the relay node n13 in the transfer route before change (of change source), as shown in FIG. 7, the relay node n13 switches (e.g. changing the message type to "delete") from the republished message to the deletion notification message (deletion message indicative of a request for deleting the storage source node information included in the republished message) and sends out the deletion notification message to the relay node n11 in a direction opposite to the root node n14 (i.e. in a downstream direction) according to the latest node information included in the own index information. Accordingly, the relay node n11 deletes the memorized index information, being the index information, which includes the storage source node information indicated in the deletion notification message. Here, it is configured such that the deletion notification message is revoked in the relay node n11 and not transferred from the relay node n11 to the relay node n8 in order to prevent the index information including the storage source node information from being deleted as well in the relay node n8 (described later in detail).

Thus in a case of transfer route change, it is possible to efficiently (without waste) register the index information to the relay node in the new transfer route after change. Further, it is possible to transfer the deletion notification message on a downstream side by including the latest node information in the index information and delete the index information from the relay node in the transfer route before change in a case of the above route change. Accordingly, it is possible to assuredly (completely) delete the index information including the storage source node information or the like (the index information registered in the relay node in the transfer route after change being deleted by the regular deletion notification message sent out from the content retention node) in a case where the content retention node is withdrawn or in a case where the content retention node deletes the content data.

Figure 8:
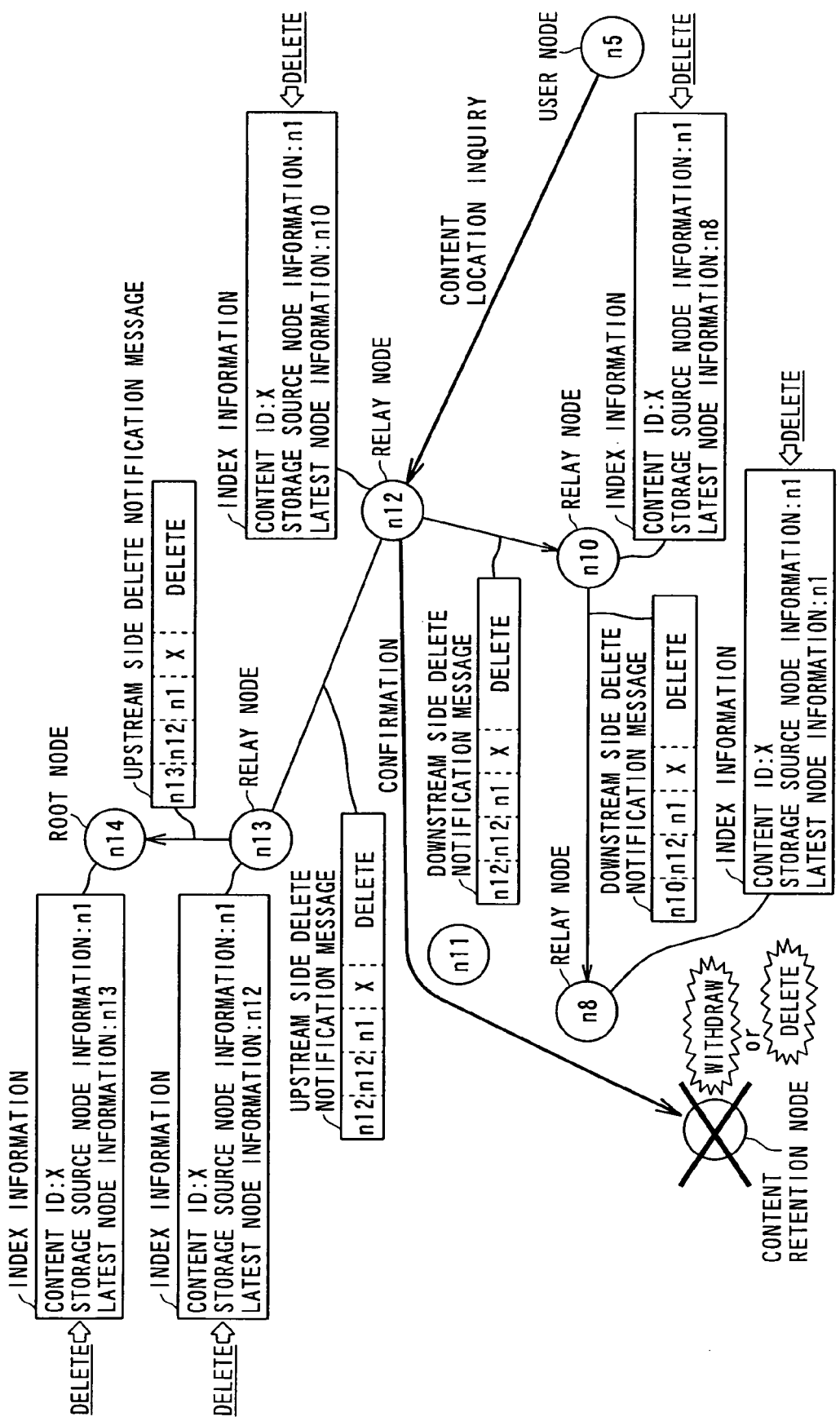
FIG. 8 is a schematic view showing a state where a deletion notification message is sent out from the relay node receiving a content location inquiry (search) to an upper stream side and a lower stream side.

Further, FIG. 8 is a schematic view showing a state where the deletion notification message is sent out from the relay node receiving the content location inquiry (search) to the upstream and downstream sides. As shown in FIG. 8, when the relay node n12 receiving the content location inquiry (search) (i.e. receiving the content location inquiry (search) message) confirms that the content retention node is withdrawn or that the content retention node deletes the content data, the relay node n12 sends out a deletion notification message to the upstream side according to the transfer destination node information registered in the DHT routing table and sends out a deletion notification message to a downstream side according to the latest node information.

Thus, the relay node can completely delete the index information including unnecessary storage source node information or the like even at the time of content location inquiry (search) from the user node, by including the latest node information in the index information.

Next, configuration and function of a node nn will be described with referenced to FIG. 9.

Figure 9:
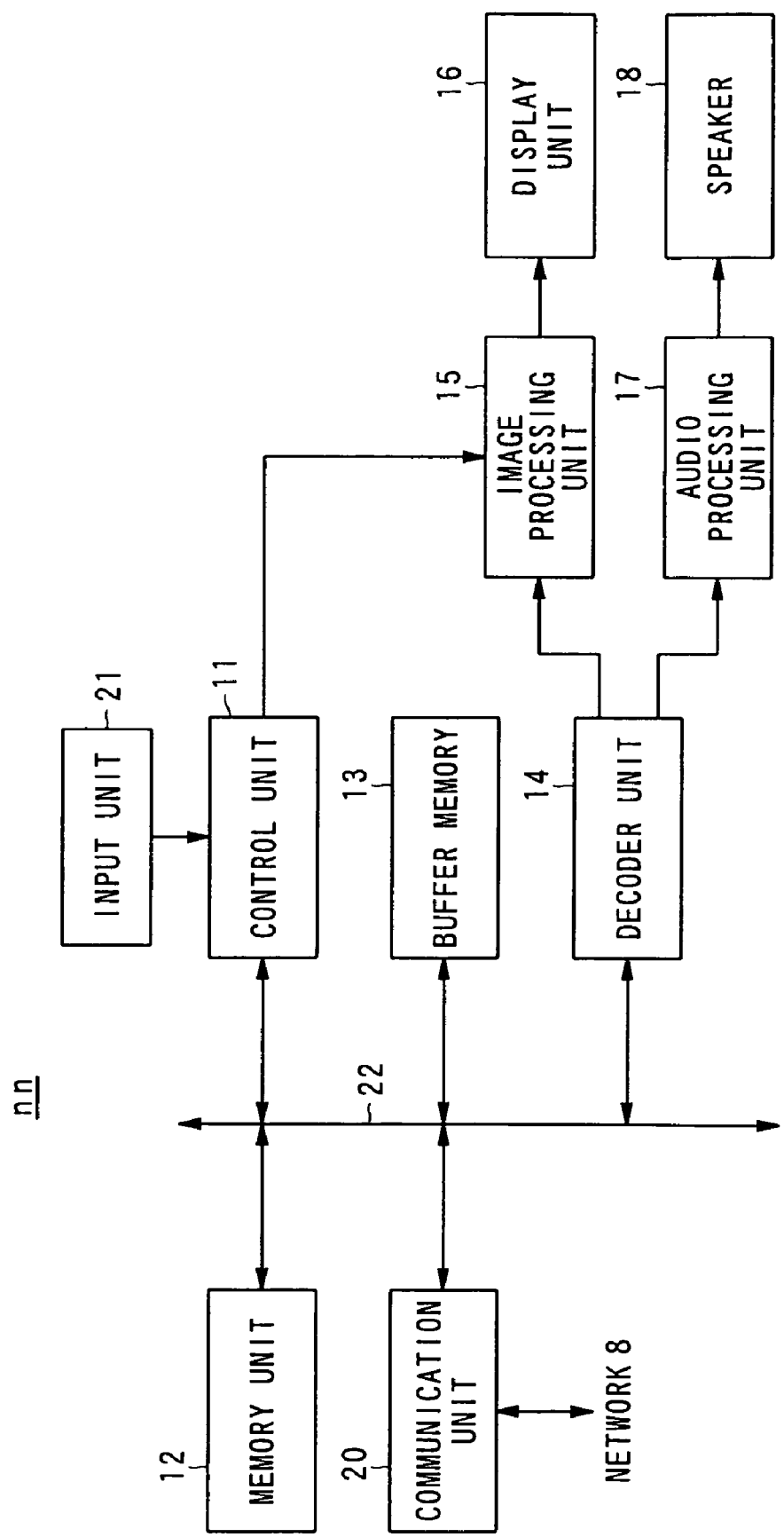
FIG. 9 is a view showing an example of a schematic configuration of the node nn.

FIG. 9 is a view showing a schematic configuration example of a node nn.

The node nn is configured by including, as shown in FIG. 9, a control unit 11 being a computer configured by a CPU having computing function, a RAM for work, and a ROM for memorizing various data and programs; a memory unit 12 being a memory means configured by an HDD or the like for memorizing and storing a various data (e.g. a content data, index information, DHT), various types of programs and the like; a buffer memory 13 for temporarily storing received content data; a decoder unit 14 for decoding (data stretch or decryption) encoded video data (image information) and audio data (voice information) included in a content data; an image processing unit 15 for providing a predetermined graphic process to the video data thus decoded or the like and outputting the data as video signal; a display unit 16 such as CRT and liquid crystal display for displaying image based on the video signal outputted from the image processing unit 15, an audio processing unit 17 for converting the decoded audio data in use of digital/analog (D/A) conversion into an analog audio signal, amplifying the converted signal by an amplifier and outputting the same; a speaker 18 for outputting the audio signal outputted from the audio processing unit 17 as acoustic wave; a communication unit 20 for carrying out communication control of information between other nodes nn through the network 8; and an input unit 21 (e.g. a keyboard, a mouse, or an operation panel) for receiving an instruction signal from a user and providing instruction to the control unit 11 in response to the instruction, wherein the control unit 11, the memory unit 12, the buffer memory 13, the decoder unit 14, and the communication unit 20 are connected each other through a bus 22. Here, a personal computer, a set top box (STB), TV receiver and the like are applicable as the nodes nn.

In such the configuration, when CPU reads out and executes a program (including the node processing program of the present invention) memorized in the memory unit 12 (a recording medium of the present invention), the control unit 11 totally controls and executes a process as any one of the above-mentioned user node, the relay node, the root node, the cache node, and the content retention node, and the control unit 11 functions as a node information change detecting means, a storage source node information extracting means, a reregistration message generating means, a reregistration message sending means, a registration message receiving means, a registration message transferring means, a memory judging means, a reregistration message transferring means, a deletion message sending means, a transfer route match judgment means, a storage source node information deleting means, a storage generation source match judgment means, a deletion message transferring means, a request message receiving means, a confirmation means, or the like according to the present invention and carries out various processes described later.

Here, to the above-mentioned index cache area, for example several kB (kilobyte) to several MB (megabyte) of a memory area in the memory unit 12 are allocated. Further in the index cache area, index information corresponding to various types of contents is memorized, and index information corresponding to content (content ID) managed by the own as a root node and index information corresponding to content (content ID) managed by the own as not a root node but a cache node are mixed and memorized in some cases.

Further, the above-mentioned node processing program may be configured for example to be downloaded from a predetermined server in the network 8. For example, the program may be recorded in a recording medium such as CD-ROM and read through a drive of the recording medium.

[2. Operation of Content Delivery System]

Next, an example of operation of the content delivery system S will be described with reference to FIGS. 10 and 14.

Figure 10:
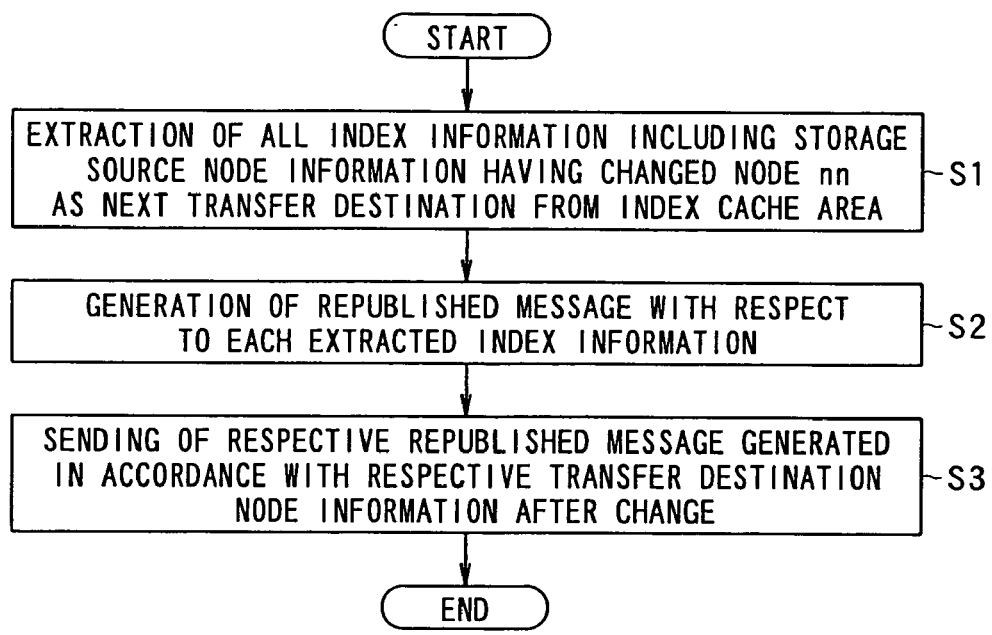
FIG. 10 is a flowchart showing a process of sending the republished message in a control unit 11 of the node nn.
Figure 11:
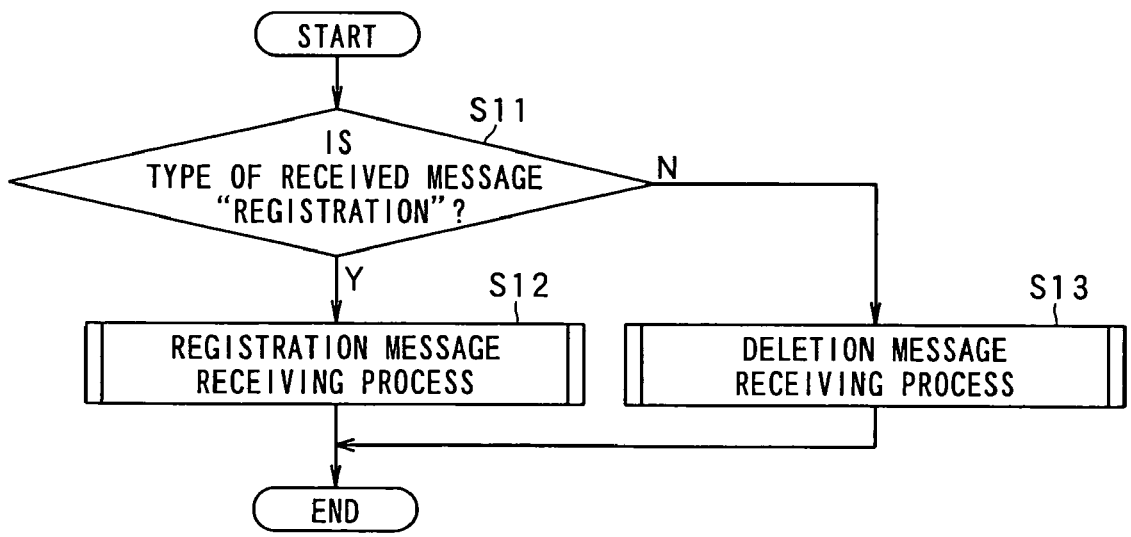
FIG. 11 is a flowchart showing a process of receiving the republished message and the like in the control unit 11 of the node nn.
Figure 12:
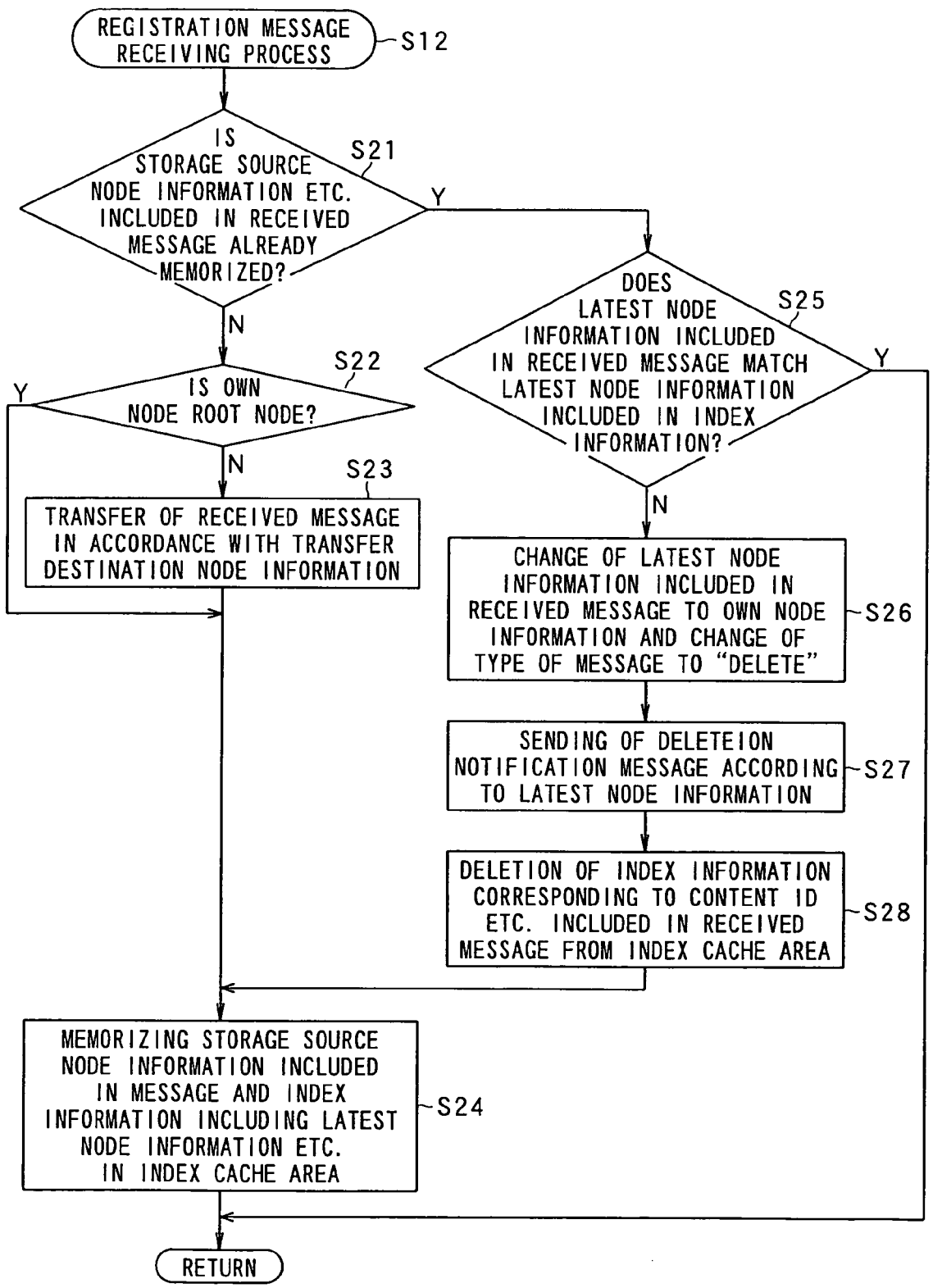
FIG. 12 is a flowchart showing a process of receiving the republished message and the like in the control unit 11 of the node nn.
Figure 13:
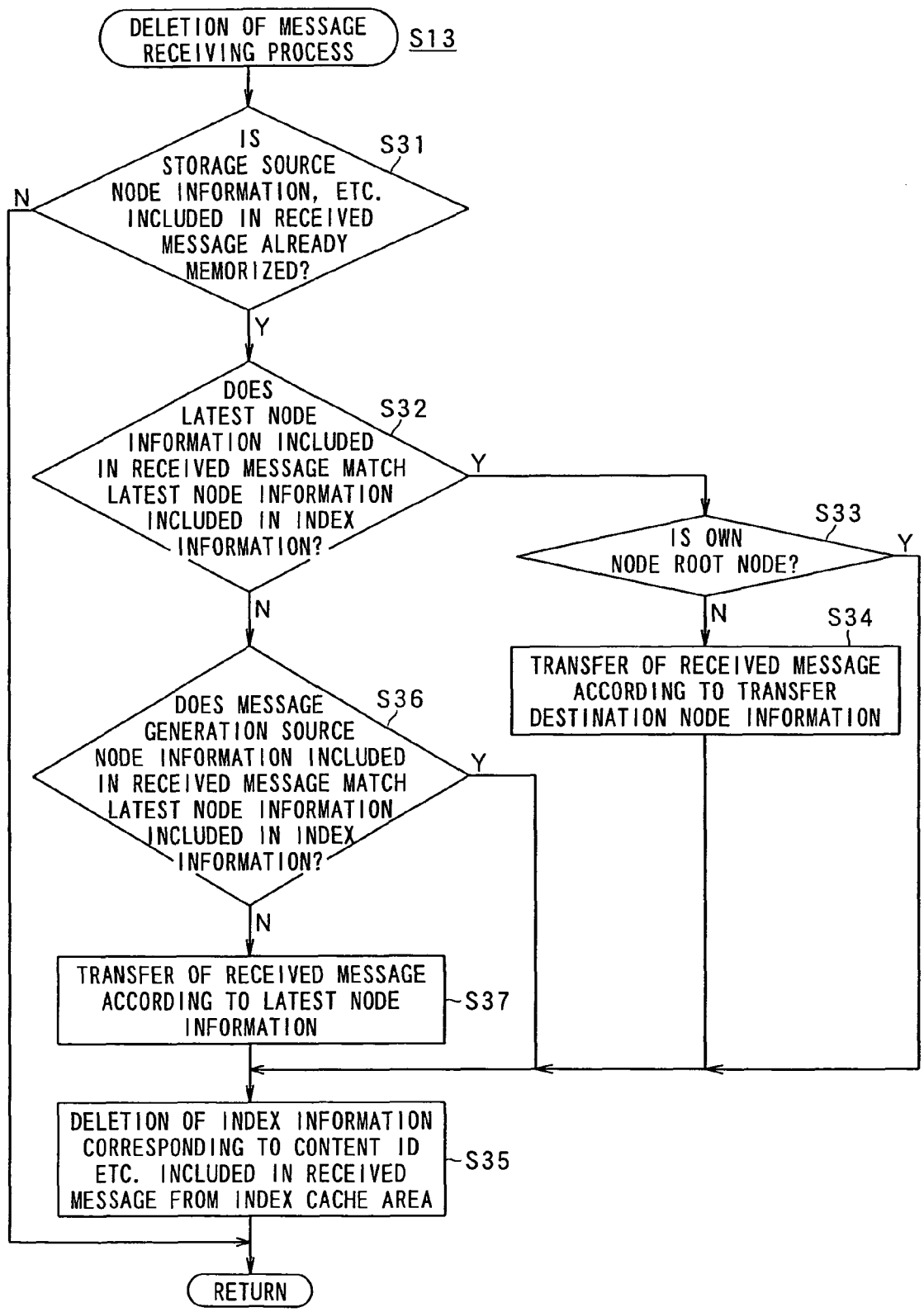
FIG. 13 is a flowchart showing a process of receiving the republished message and the like in the control unit 11 of the node nn.

FIG. 10 is a flowchart showing a republished message sending process in the control unit 11 of the node nn. FIGS. 11 to 13 are flowcharts showing receiving processes of republished message or the like in the control unit 11 of the node nn. FIG. 14 is a flowchart showing a content location inquiry (search) message receiving process in the control unit 11 of the node nn.

The process shown in FIG. 10 starts when a given node nn detects that transfer destination node information registered in the DHT routing table changes, that is, the transfer destination of a message corresponding to a given content ID changes. Here change of the transfer destination node information includes for example the following cases (1) to (3).

(1) A case where the transfer destination node information is newly added and registered in unregistered table entry (e.g. portion of numeral reference 51 shown in FIG. 2) in the DHT routing table (e.g. in a case where a message (e.g. registration message) reaches from the node nn not registered in the DHT routing table, and the table entry corresponding to the node ID of the node nn is blank (unregistered), the transfer destination node information of the node nn is added to be registered).

(2) A case where the transfer destination node information is deleted from the table entry in the DHT routing table (e.g. it is realized that the node nn corresponding to the transfer destination node information is withdrawn (including temporary withdrawal).

(3) A case where transfer destination node information registered in the table entry in the DHT routing table is overwritten and registered in the other transfer destination node information (e.g. in a case where a message (e.g. registration message) reaches from the node nn not registered in the DHT routing table, and the table entry corresponding to the node ID of the node nn is registered, the transfer destination node information of the node nn is overwritten and registered in the table entry).

Here, history of changes of the transfer destination node information (e.g. changed time, changed table entry, transfer destination node information before change, and transfer destination node information after change) is memorized in the memory unit 12.

When the process shown in FIG. 10 starts, the control unit 11 of the node nn first extracts and acquires all the index information including the storage source node information making the node nn registered in the table entry specified from a line and a column as the next transfer destination from the index cache area in the memory unit 12 (i.e. storage source node information included in the published message transferred in response to the transfer destination information before change) (Step S1). Here, index information corresponding to the content ID the own manages as a root node is not included for extraction.

Next, the control unit 11 of the node nn generates storage source node information and the content ID included in the index information thus extracted, and the republished message (types of message being "registration") including the own node information indicative of the own and message generation source information, with respect to every index information thus extracted (Step S2).

Next, the control unit 11 of the node nn sends the republished message thus generated in response to respective transfer destination node information after change (i.e. to the IP address and the port number included in the transfer destination node information) (Step S3). Then the process is finished.

Thus, for example, as shown in FIG. 6, the republished message is sent from the relay node (cache node) n8 to the relay node (cache node) n10.

Next, the process of FIG. 11 starts when a node nn arbitrarily selected receives a published message, a republished message or a deletion notification message.

When the process shown in FIG. 11 starts, the control unit 11 of the node nn judges whether or not a type of the received message is "registration" (Step S11). In a case where the type is "registration" (Step S11: Y), the process goes to Step S12, and in a case where the type is not "registration" (i.e. "delete") (Step S11: N). Then the process goes to Step S13.

In the registration message receiving process shown in Step S12, as shown in FIG. 12, the control unit 11 judges whether or not the storage source node information and the content ID included in the message is already memorized in the index cache area as index information (Step S21). In a case where the storage source node information is not memorized (Step S21: N), the control unit 11 judges whether or not the own is the root node of the content ID included in the message (e.g. whether or not the own node ID is closest to the content ID (the upper digits match the most)) (Step S22).

Then, in a case where the own node is not the root node of the content ID (Step S22: N), the control unit 11 changes the latest node information indicative of the latest node nn included in thus received message (e.g. republished message), and transfers the message according to the transfer destination node information of the node nn (e.g. node nn having node ID closest to the content ID included in the message (the upper digits match the most)) to be the next transfer destination which is registered in the own DHT routing table (i.e. to the IP address and the port number of the transfer destination node information) (Step S23).

Next, the control unit 11 memorizes, in the index cache area in the memory unit 12, the index information including the storage source node information and the content ID which are included in thus received message and the latest node information which is indicative of the latest node nn included when the message is received (Step S24). Then the process returns to the process shown in FIG. 11 (end of process).

Thus, for example, as shown in FIG. 6, the republished message is transferred from the relay node n10 to the relay node n12. Here, the above processes of Steps S22 to S24 are also carried out when the published message sent out from the content retention node is received.

On the other hand, in the above Step S22, in a case where the own is the root node of the content ID included in the above-mentioned message (in this case, the message is the published message (or republished message) sent out from the content retention node) (Step S22: Y), the control unit 11 memorizes, in the index cache area in the memory unit 12, the index information including the storage source node information and the content ID which are included in thus received message and the latest node information which is indicative of the latest node nn included in the message (Step S24). Then the process returns to the process shown in FIG. 11 (end of process)

Meanwhile, in the Step S21, in a case where it is judged that the storage source node information and the content ID included in the message is memorized in the index cache area as index information (Step S21: Y), the control unit 11 further judges whether or not the latest node information indicative of the latest node nn transferring the message matches the latest node information memorized in correspondence with the storage source node information and the content ID which are included in the message (Step S25). In a case where they match (Step S25: Y), the process unit 11 returns the process shown in FIG. 11 (end of process). In a case where the latest node information indicative of the latest node nn transferring the message (e.g. republished message) matches the latest node information (i.e. the latest node information included in the previous message) memorized in the index cache area in correspondence with the storage source node information and the content ID which are included in the message, it means there is no route change, and the message is sent out from the content retention node and transferred from the node nn in the transfer route before the change (e.g. from the node n11 to the node n13 shown in FIG. 6). This is done in order not to send the deletion notification message described later to a downstream side.

Meanwhile, in a case where it is judged that the latest node information indicative of the latest node nn transferring the message does not match the latest node information memorized in correspondence with the storage source node information and the content ID which are included in the message (e.g. in a case where the message is transferred from the node n12 to the node n13 shown in FIG. 6) (Step S25: N), the control unit 11 changes the latest node information indicative of the latest node nn included in the received message (republished message) to the own node information indicative of the own and changes the message type to "delete" (i.e. changing the republished message to the deletion notification message) (Step S26).

Then, the control unit 11 sends the above deletion notification message (the deletion notification message indicative of deletion request of the storage source node information included in the republished message) according to the latest node information memorized in index cache area in correspondence with the storage source node information and the content ID which are included in the received message (republished message) (i.e. to the IP address and the port number included in the latest node information) (Step S27). That is, only in a case where it is judged that the latest node information indicative of the latest node nn transferring the message does not match the latest node information memorized in correspondence with the storage source node information and the content ID which are included in the message (Step S25), the deletion notification message is sent downstream.

Thus, for example, as shown in FIG. 7, the deletion notification message is sent from the relay node n13 to the node n11.

Next, the control unit 11 deletes the index information corresponding to the content ID and the storage source node information included in the received message (republished message) from the index cache area (Step S28). The control unit 11 newly memorizes the index information including the storage source node information and content ID, which are included in the message, and the latest node information indicative of the latest node nn included when the message is received, in the index cache area in the memory unit 12 (Step S24). Then the process returns to the process of FIG. 11 (end of process).

Meanwhile, in the deletion message receiving process shown in Step S13, as shown in FIG. 13, the control unit 11 judges whether or not the storage source node information and the content ID which are included in the deletion notification message are already memorized in the index cache area as index information (Step S31). When the control unit 11 judges that the storage source node information is not memorized (Step S31: N), the process returns the process shown in FIG. 11 (end of process).

Meanwhile, in a case where the control unit 11 judges that the storage source node information and the content ID which are included in the deletion notification message are memorized in the index cache area as index information (Step S31: Y), the control unit 11 further judges whether or not the latest node information indicative of the latest node nn transferring the message matches the latest node information memorized in correspondence with the storage source node information and the content ID which are included in the message (Step S32). In a case where they match (where there is no route change and it is the deletion notification message sent out from the content retention node) (Step S32: Y). Then the process goes to Step S33. In a case where they do not match (Step S32: N), it goes to Step S36.

In Step S33, the control unit 11 judges whether or not the own is the root node of the content ID included in the deletion notification message. In a case where it is not the root node (Step S33: N), the received deletion notification message is transferred according to the transfer destination node information of the node nn to be the next transfer destination registered in the own DHT routing table (Step S34). Meanwhile, in a case where the own is the root node (Step S33: Y), the control unit 11 deletes the index information corresponding to the content ID and the storage source node information, which are included in the received deletion notification message, from the index cache area (Step S35). Then the process returns to the process of FIG. 11 (end of process).

Meanwhile, in Step S36, the control unit 11 judges whether or not the message generation source node information (i.e. reregistration message generation source node information indicative of the node nn of the republished message generation source corresponding to (based on) the deletion notification message) included in the deletion notification message thus received matches the latest node information memorized in index cache area in correspondence with the storage source node information and the content ID which are included in the message. Then, in a case where the control unit 11 judges that the message generation source node information matches the latest node information (e.g. in a case where the message sent out from the relay node n8 returns as shown in FIG. 7) (Step S36: Y), the control unit 11 revokes the deletion notification message (without transferring the message downstream), deletes the index information corresponding to the content ID and the storage source node information which are included in the received deletion notification message, from the index cache area (Step S35). Then the process returns to the process shown in FIG. 11 (end of process). Therefore, for example as shown in FIG. 7, the index information is deleted from the node nil in the old transfer route.

Meanwhile, in a case where the control unit 11 judges that the message generation source node information does not match the latest node information (Step S36: Y), the control unit 11 transfers the received deletion notification message according to the latest node information memorized in the index cache area in correspondence with the storage source node information and the content ID which are included in the message (i.e. to the IP address and the port number included in the latest node information) (being transferred to a downstream side) (Step S37). Then, the control unit 11 deletes the index information corresponding to the content ID and the storage source node information which are included in the received deletion notification message, from the index cache area (Step S35). Then the process returns to the process shown in FIG. 11 (end of process).

In other words, only in a cases where it is judged that the latest node information indicative of the previous node nn transferring the message does not match the latest node information memorized in correspondence with the storage source node information and the content ID which are included in the message (Step S32), the deletion notification message is transferred on a downstream side.

Figure 14:
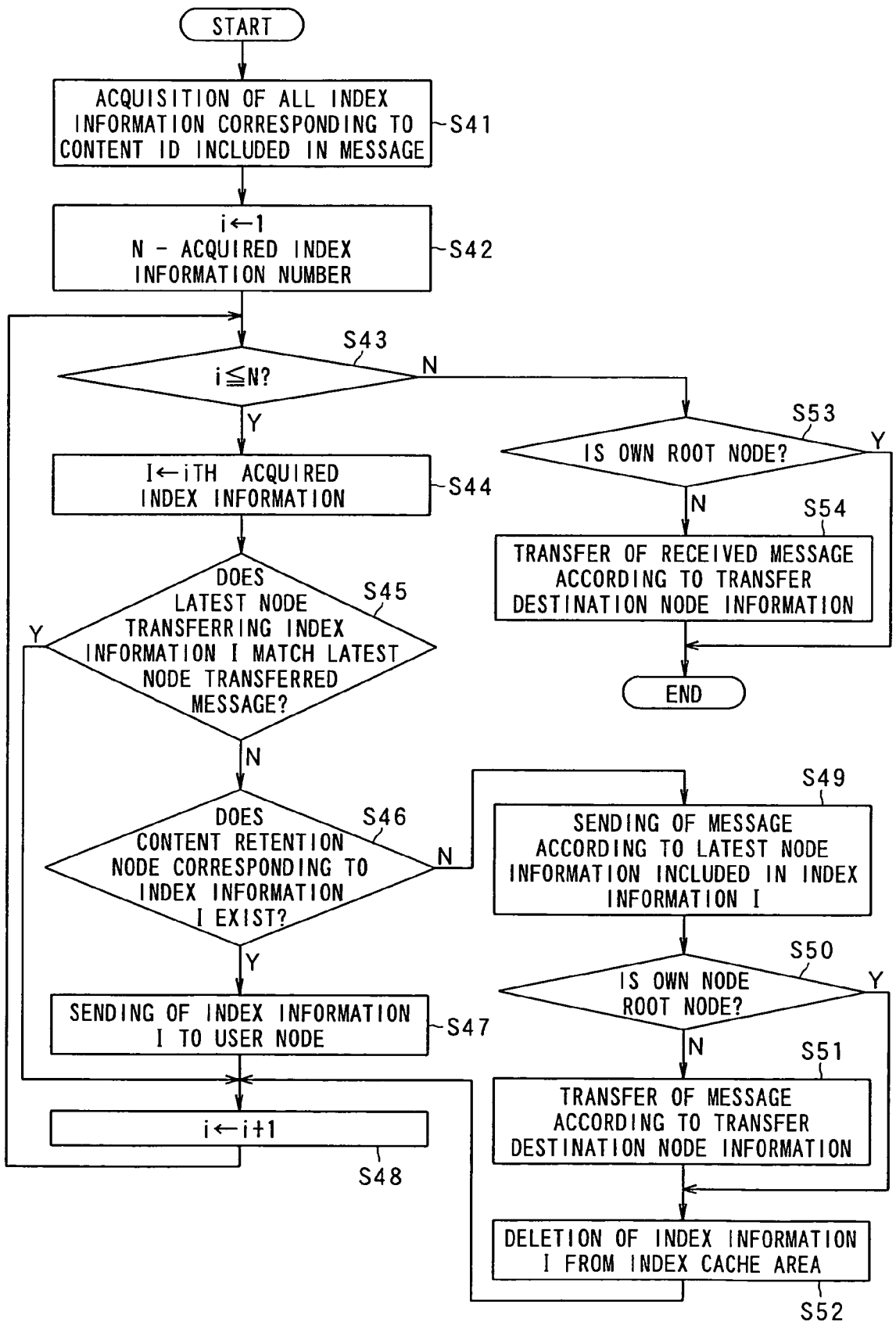
FIG. 14 is a flowchart showing a process of receiving the content location inquiry (search) message in the control unit 11 of the node nn.

Next, the process shown in FIG. 14 starts only when a node nn arbitrarily selected receives the content location inquiry (search) message (request message indicative of a request of storage source node information).

When the process shown in FIG. 14 starts, the control unit 11 of the node nn acquires all the index information corresponding to the content ID included in the received content location inquiry (search) message from the index cache area (Step S41).

Next, the control unit 11 respectively sets (initializes) a variable number i to "1" and a variable number N to the number of the index information thus acquired (Step S42).

Next, the control unit 11 judges whether or not the variable number i is the variable number N or less (Step S43). In a case where the variable number i is the variable number N or less (Step S43: Y), the index information acquired at "i"th order is made to correspond with the variable number I (Step S44).

Next, the control unit 11 judges that the relay node indicated by the latest node information included in the index information in correspondence with the variable number I (hereinafter referred to as "index information I") matches the latest relay node transferring the received content location inquiry (search) message (Step S45). In a case where they do not match (Step S45: N), the control unit 11 confirms that the content retention node exists (i.e. being not withdrawn) (or may confirm that the content retention node stores the content data corresponding to the content ID related to the above request) (Step S46). For example, the node nn tries access to the content retention node according to the storage source node information included in the index information I and confirms that the content retention node exists or stores the content data corresponding to the content ID related to the request.

Then in a case where the content retention node exists (or storing the content data corresponding to the content ID related to the request) (Step S46: Y), the control unit 11 transfers the index information I to the user node of transfer source of the content location inquiry (search) message (Step S47), one-increments the variable number i (Step S48). Then the process returns to the above Step S43.

On the other hand, in Step S45, in a case where the relay node indicated by the latest node information included in the index information I matches the latest relay node transferring the received content location inquiry (search) message (Step S45: Y), duplicated index information I is not notified because the index information I is considered to be sent already to the user node by the latest relay node, and the control unit 11 does not carry out the process of Steps S46 and S47. Then the process goes to the Step S48.

Meanwhile, in Step S46, in a case where the content retention node does not exist (or not storing the content data corresponding to the content ID related to the request) (Step S46: N), the control unit 11 generates a downstream deletion notification message indicative of the deletion request of the index information I including the storage source node information related to the request and sends the message on the downstream side (i.e. to the IP address and the port number included in the latest node information) in accordance with the latest node information included in the index information I (Step S49).

Thus, for example, as shown in FIG. 8, the downstream deletion notification message is sent from the relay node n12 to the relay node n10, the downstream deletion notification message is transferred up to the content retention node as shown in FIG. 8, and the index information I is deleted on the relay node in the transfer route.

Next, the control unit 11 judges whether or not the own is the root node of the content ID included in the index information I (e.g. whether or not the own node ID is closest to the content ID (upper digit matches the most) (Step S50). In a case where it is not the route node (Step S50: N), the upstream deletion notification message indicative of the deletion request of the index information I including the storage source node information related to the request, and transfers the message in accordance with a transfer destination node information of the node nn to be a transfer destination registered in the own DHT routing table (e.g. the transfer destination node information closest to the content ID included in the index information I (e.g. upper digit matches the most) (in other words, addressed to the IP address and the port number included in the transfer destination node information) (Step S51). Then the process goes to Step S52. Meanwhile, in a case where the own node is a root node of the content ID included in the index information I (Step S50: Y), the process goes to Step S52.

Thus, for example, as shown in FIG. 8, the upstream deletion notification message is sent from the relay node n12 to the relay node n13, the upstream deletion notification message is transferred up to the root node as shown in FIG. 8, and the index information I is deleted in the root node and the relay node in the transfer route.

Next, in Step S52, the control unit 11 deletes the index information I from the index cache area. Then the process goes to Step S48.

The above-mentioned processes are repeatedly carried out until the variable number N becomes equal to the variable number N, and in a case where the variable number i becomes equal to the variable number N (i.e. the above process is completed with respect to all of the index information acquired in Step S41) (Step S43: N), the process moves to Step S53 and the control unit 11 judges whether or not it is the root node of the content ID included in the content location inquiry (search) message (Step S53). In a case where it is not the root node (Step S53: N), the control unit 11 transfers the content location inquiry (search) message according to the transfer destination node information of the node nn to be the transfer destination registered in the own DHT routing table (Step S54) and finishes the process. Meanwhile, in a case where it is the root node of the content ID (Step S53: Y), the process is finished.

As mentioned above, according to the present embodiment, in a case where the relay node detects a change of the transfer destination node information, the relay node extracts the content ID and the storage source node information included in the published message thus transferred according to the transfer destination node information before change, generates the republished message including the content ID and the storage source node information thus extracted, sends this in accordance with the transfer destination node information after the change, and transfers the republished message toward the root node of the content ID (on a upstream side). According to such the configuration, it is possible to memorize index information on the relay node in the new transfer route after change more efficiently (without waste) without loading burden on the network 8, compared with sending out the republished message from the content retention node at predetermined intervals.

Further, in a case where the transferred republished message is received by the relay node in the original transfer route, the republished message is switched to the deletion notification message and transferred toward the content retention node (on a downstream side), and the index information is deleted from the relay node in the old transfer route. Therefore, the transfer route is changed and the content retention node is withdrawn, or the node deletes the content data is deleted, it is possible to delete unnecessary index information efficiently (without waste) and assuredly (without fail). Furthermore, since the deletion notification message is sent out when the transfer route is changed, it is possible to delete unnecessary index information assuredly without reducing the content data search efficiency and without loading burden on the network 8. Therefore, it is possible to prevent the index cache area from being occupied by the unnecessary index information. Accordingly, it is possible to prevent even the necessary index information from failing to memorize due to over memory capacity of the index cache area, without deteriorating efficiency in the content data search.

Further, because the latest node information is included in the index information, the deletion notification message can be transferred onto a downstream side in a case of a route change. Further, the message generation source node information is included in the republished message, the deletion notification message transferred onto a downstream side can be stopped before the relay node of the republished message generation source (Refer to FIG. 7).

Further, because the latest node information is included in the index information, it is possible to send the deletion notification message on a downstream side even during content location inquiry (search) from the user node and completely delete the unnecessary index information (Refer to FIG. 8).

Here, in the above-mentioned embodiment, the explanation is given on a premise that the overlay network 9 is configured by the algorithm using DHT. However, the present invention is not limited thereto.

The present invention is not confined to the configuration listed in the foregoing embodiments, but it is easily understood that the person skilled in the art can modify such configurations into various other modes, within the scope of the present invention described in the claims.

What is claimed is:

1. A node device included in an information delivery system, which includes a plurality of node devices enabled to mutually communicate through a network, wherein transfer destination node information indicative of a node device to which a message received from another node device is transferred, is memorized in the node devices, and at least one piece of delivery information is stored in the node devices in a distributed manner, wherein a registration message including storage source node information indicative of one node device storing the delivery information is sent out of the one node device in a case where the delivery information is stored in the one node device, the registration message is transferred up to a node device for managing a location of delivery information by a plurality of relay node devices in accordance with the transfer destination node information, and the storage source node information is memorized in the relay node devices and the node device for managing the location of delivery information, wherein one of the relay node devices included in the information delivery system, comprising:

a memory unit that memorizes the transfer destination node information and the storage source node information;

a node information change detection unit that detects a change of the transfer destination node information;

a storage source node information extraction unit that extracts the storage source node information, which is included in the registration message transferred in accordance with the transfer destination node information before the change, from the memory unit;

a reregistration message generation unit that generates a reregistration message including the storage source node information thus extracted; and a reregistration message sending unit that sends thus generated reregistration message in accordance with the transfer destination node information after the change.

2. The node device according to claim 1, further comprising:

a registration message receiving unit that receives the registration message including latest node information indicative of the latest node device sending or transferring the registration message to the own node in addition to the storage source node information, and a registration message transfer unit that changes the latest node information included in thus received registration message to own node information indicative of the own node and transfers the registration message in accordance with the transfer destination node information.

3. The node device according to claim 1, wherein the reregistration message generation unit generates a reregistration message including the storage source node information and reregistration message generation source node information indicative of the own node, being a reregistration message generation source.

4. The node device according to claim 1, the node device receiving a reregistration message sent from the relay node device or the reregistration message transferred from another relay node device, the node device comprising:

a memory unit that memorizes the transfer destination node information;

a memory judgment unit that judges whether or not the storage source node information included in thus received reregistration message is already memorized; and a reregistration message transfer unit that memorizes the storage source node information and transfers the reregistration message in accordance with the transfer destination node information in a case where it is judged not memorized.

5. The node device receiving the reregistration message which is sent from the relay node device according to claim 1, and transferred from another relay node device, the node device comprising:

a memory unit that memorizes latest node information indicative of the latest node device sending or transferring the registration message to the own node in correspondence with the storage source node information included in the registration message;

a memory judgment unit that judges whether or not the storage source node information included in thus received reregistration message is already registered; and a deletion message sending unit that sends a deletion message indicative of a deletion request of the storage source node information included in the reregistration message in accordance with the latest node information memorized in correspondence with the storage source node information, in a case where it is judged to be memorized.

6. The node device according to claim 5, further comprising:

a transfer route match judgment unit that judges whether or not node information indicative of the latest node device transferring the reregistration message matches the latest node information memorized in correspondence with the storage source node information, wherein the deletion message sending unit sends deletion message in accordance with the latest node information, in a case where the transfer route match judgment unit judges that the node information does not match the latest node information.

7. A node device receiving the deletion message sent from the node device according to claim 5, the node device comprising:

a memory unit that memorizes the latest node information indicative of the latest node device sending or transferring the registration message to the own node in correspondence with the storage source node information included in the registration message;

a storage source node information deleting unit that deletes the storage source node information which is indicated in the deletion message and thus memorized;

a message generation source match judgment unit that judges whether or not the reregistration message generation source node information indicative of a reregistration message generation node device, corresponding to the deletion message matches the latest node information memorized in correspondence with the storage source node information; and a deletion message transfer unit that transfers the deletion message indicative of the deletion request in accordance with the latest node information in a case where it is judged that the reregistration message generation node device does not match the latest node information.

8. The node device according to claim 7, further comprising:

a transfer route match judgment unit that judges whether or not the node information indicative of the latest node device transferring the reregistration message matches the latest node information memorized in correspondence with the storage source node information, wherein the deletion message transfer unit transfers the deletion message in accordance with the latest node information, in a case where the transfer route match judgment unit judges that the node information does not match the latest node information.

9. A non-transitory computer-readable storage medium that stores a computer-executable program representing a sequence of instructions, which when executed by a computer the instructions cause the computer to function as one of the relay node devices according to claim 1.

10. A node device included in an information delivery system that includes a plurality of node devices enabled to mutually communicate through a network, wherein transfer destination node information indicative of a node device, to which a message received from another node device is transferred, is memorized in the node devices, and at least one piece of delivery information is stored in the node devices in a distributed manner, wherein a registration message including storage source node information indicative of one node devices, storing the delivery information is sent out of the one node device in a case where the delivery information is stored in the one node device, the registration message is transferred up to a node device for managing a location of delivery information by a plurality of relay node devices in accordance with the transfer destination node information, and the storage source node information and the latest node information indicative of a latest node device for sending or transferring the registration message to the own node are memorized in correspondence with each other in the relay node devices and the node device for managing the location of delivery information in the information delivery system, wherein one of the relay node devices included in the information delivery system comprising:

a memory unit that memorizes the transfer destination node information, the storage source node information, and the latest node information;

a request message receiving unit that receives a request message indicative of a request of the storage source node information;

a confirmation unit that confirms that a node device indicated in storage source node information related to the request exists;

a deletion message sending unit that sends an upstream side deletion message indicative of a deletion request of the storage source node information thus requested and sending a downstream side deletion message indicative of deletion request of the storage source node information related to the request in a case where it is confirmed that the node device indicated in storage source node information does not exist; and a storage source node information deleting unit that deletes the storage source node information related to the request and thus memorized in a case where it is confirmed that the node device indicated in storage source node information does not exist.

11. A node device included in an information delivery system that includes a plurality of node devices enabled to mutually communicate through a network, wherein transfer destination node information indicative of a node device, to which a message received from another node device is transferred, is memorized in the node devices, and at least one piece of delivery information is stored in the node devices in a distributed manner, wherein a registration message including a storage source node information indicative of one node device, storing the delivery information is sent out of the one node device in a case where the delivery information is stored in the one node device, the registration message is transferred up to a node device for managing a location of delivery information by a plurality of relay node devices in accordance with the transfer destination node information, and the storage source node information and the latest node information indicative of a latest node device for sending or transferring the registration message to the own node are memorized in correspondence with each other in the relay node devices and the node device for managing delivery information location in the information delivery system, wherein the relay node device included in the information delivery system comprising:

a memory unit that memorizes the transfer destination node information, the storage source node information, and the latest node information; and a request message receiving unit that receives a request message indicative of request of the storage source node information;

a confirmation unit that confirms whether or not the node device indicated in the storage source node information related to the request stores the delivery information;

a deletion message sending unit that sends an upstream side deletion message indicative of a deletion request of the storage source node information related to the request and sends a downstream side deletion message indicative of a deletion request of the storage source node information related to the request in a case where it is confirmed that the node device indicated in storage source node information does not store; and a storage source node information deleting unit that deletes the storage source node information related to the request and thus memorized in a case where it is confirmed that the node device indicated in storage source node information does not exist.

12. A node device receiving the downstream side deletion message sent from the node device according to claim 10, further comprising:

a memory unit that memorizes the storage source node information and the latest node information, and a storage source node information deleting unit that deletes the storage source node information thus memorized.

13. An information delivery system including a plurality of node devices enabled to mutually communicate through a network, wherein transfer destination node information indicative of a node device to which a message received from another node device is transferred, is memorized in the node devices, and at least one piece of delivery destination information is stored in the node devices in a distributed manner, wherein a registration message including a storage source node information indicative of one node device storing the delivery information is sent out of the one of the node devices in a case where the delivery information is stored in the one node device, the registration message is transferred up to a node device for managing a location of delivery information by a plurality of the relay node devices in accordance with the transfer destination node information, and the storage source node information is memorized in the relay node devices and the node device for managing the location of delivery information, wherein the relay node device comprising:

a memory unit that memorizes the transfer destination node information and the storage source node information;

a node information change detection unit that detects a change of the transfer destination node information;

a storage source node information extraction unit that extracts the storage source node information, which is included in the registration message transferred in accordance with the transfer destination node information before the change from the memory unit;

a reregistration message generation unit that generates a reregistration message including the storage source node information thus extracted; and a reregistration message sending unit that sends thus generated reregistration message in accordance with the transfer destination node information after the change, wherein the node device receiving the reregistration message comprising:

a memory unit that memorizes the transfer destination node information;

a memory judgment unit that judges whether or not the storage source node information included in thus received reregistration message is already memorized; and a reregistration message transfer unit that memorizes the storage source node information and transfers the reregistration message in accordance with the transfer destination node information in a case where it is judged not memorized.

14. An information delivery system including a plurality of node devices enabled to mutually communicate through a network, wherein transfer destination node information indicative of a node device, to which a message received from another node device is transferred, is memorized in the node devices, and at least one piece of delivery information is stored in the node devices in a distributed manner, wherein a registration message including a storage source node information indicative of one node device storing the delivery information is sent out of the one node device in a case where the delivery information is stored in the one node device, the registration message is transferred up to a node device for managing a location of delivery information by a plurality of the relay node devices in accordance with the transfer destination node information, and the storage source node information is memorized in the relay node devices and the node device for managing the location of delivery information wherein the relay node device comprising:

a memory unit that memorizes the transfer destination node information and the storage source node information;

a node information change detection unit that detects a change of the transfer destination node information;

a storage source node information extraction unit that extracts the storage source node information, which is included in the registration message transferred in accordance with the transfer destination node information before the change from the memory unit;

a reregistration message generation that generates a reregistration message including the storage source node information thus extracted; and a reregistration message sending unit that sends thus generated reregistration message in accordance with the transfer destination node information after the change, wherein the node device receiving the reregistration message comprising:

a memory unit that memorizes latest node information indicative of a latest node device sending or transferring the registration message to the own node device in correspondence with the storage source node information included in the registration message;

a memory judgment unit that judges whether or not the storage source node information included in thus received reregistration message is already memorized; and a deletion message sending unit that sends a deletion message indicative of a deletion request of the storage source node information included in the reregistration message in accordance with the latest node information, memorized in correspondence with the storage source node information in a case where it is judged memorized.

15. A reregistration message sending method in an information delivery system including a plurality of node devices enabled to mutually communicate through a network, wherein transfer destination node information indicative of a node device, to which a message received from another node device is transferred, is memorized in the node devices, and at least one piece of delivery information is stored in the node devices in a distributed manner, wherein a registration message including storage source node information indicative of one node device storing the delivery information is sent out of the one node device in a case where the delivery information is stored in the one node device, the registration message is transferred up to a node device for managing the delivery information location by the relay node devices in accordance with the transfer destination node information, and the storage source node information is memorized in the relay node devices and the node device for managing a location of delivery information, wherein the reregistration message sending method comprising the steps of:

detecting a change of the transfer destination node information;

extracting the storage source node information, which is included in the registration message transferred in accordance with the transfer destination node information before the change, from a memory unit;

generating the reregistration message including the storage source node information thus extracted;

sending thus generated reregistration message in accordance with the transfer destination node information after the change;

judging whether or not the storage source node information included in thus received reregistration message is already memorized; and memorizing the storage source node information and transferring the reregistration message in accordance with the transfer destination node information in a case where it is judged not memorized.

16. A reregistration message sending method in an information delivery system including a plurality of node devices enabled to mutually communicate through a network, wherein transfer destination node information indicative of a node device, to which a message received from another node device is transferred, is memorized in the node devices, and at least one piece of delivery information is stored in the node devices in a distributed manner, wherein a registration message including a storage source node information indicative of one node device storing the delivery information is sent out of the one node device in a case where the delivery information is stored in the one node device, the registration message is transferred up to a node device for managing the delivery information location by a plurality of relay node devices in accordance with the transfer destination node information, and the storage source node information is memorized in the relay node devices and the node device for managing a location of delivery information, wherein the reregistration message sending method comprising the steps of:
detecting a change of the transfer destination node information;
extracting the storage source node information, which is included in the registration message transferred in accordance with the transfer destination node information before the change, from a memory unit;
generating the reregistration message including the storage source node information thus extracted;
sending thus generated reregistration message in accordance with the transfer destination node information after the change;

judging whether or not storage source node information included in thus received reregistration message is already memorized; and
sending a deletion message indicative of a deletion request of the storage source node information included in the reregistration message in accordance with latest node information, memorized in correspondence with the storage source node information in a case where it is judged memorized.

* * * * *